United States Patent
Parker et al.

(10) Patent No.: US 12,271,320 B2
(45) Date of Patent: Apr. 8, 2025

(54) APPARATUS AND METHOD USING PLURALITY OF PHYSICAL ADDRESS SPACES

(71) Applicant: ARM LIMITED, Cambridge (GB)

(72) Inventors: Jason Parker, Sheffield (GB); Andrew Brookfield Swaine, Sheffield (GB); Yuval Elad, Cambridge (GB); Martin Weidmann, Cambridge (GB)

(73) Assignee: Arm Limited, Cambridge (GB)

( * ) Notice: Subject to any disclaimer, the term of this patent is extended or adjusted under 35 U.S.C. 154(b) by 29 days.

(21) Appl. No.: 17/906,625

(22) PCT Filed: Jan. 26, 2021

(86) PCT No.: PCT/GB2021/050173
§ 371 (c)(1),
(2) Date: Sep. 19, 2022

(87) PCT Pub. No.: WO2021/191575
PCT Pub. Date: Sep. 30, 2021

(65) Prior Publication Data
US 2023/0176983 A1    Jun. 8, 2023

(30) Foreign Application Priority Data

Mar. 24, 2020  (GB) ..................................... 2004258

(51) Int. Cl.
*G06F 12/14*    (2006.01)
*G06F 12/0808*  (2016.01)
*G06F 12/1045*  (2016.01)

(52) U.S. Cl.
CPC ...... *G06F 12/1425* (2013.01); *G06F 12/0808* (2013.01); *G06F 12/1063* (2013.01); *G06F 12/1458* (2013.01)

(58) Field of Classification Search
None
See application file for complete search history.

(56) References Cited

U.S. PATENT DOCUMENTS 7,076,634 B2 * 7/2006 Lambeth ............. G06F 12/0284
                                                711/E12.013
7,287,140 B1 * 10/2007 Asanovic ............ G06F 12/1483
                                                711/208

(Continued)

FOREIGN PATENT DOCUMENTS

CN     110442425     11/2019
JP    2004-272594     9/2004

(Continued)

OTHER PUBLICATIONS

U.S. Appl. No. 17/906,581, filed Sep. 16, 2022, Parker et al.

(Continued)

*Primary Examiner* — Elias Mamo
(74) *Attorney, Agent, or Firm* — NIXON & VANDERHYE P.C.

(57) ABSTRACT

Address translation circuitry (16) translates a virtual address specified by a memory access request issued by requester circuitry into a target physical address (PA). Requester-side filtering circuitry (20) performs a granule protection lookup based on the target PA and a selected physical address space (PAS) associated with the memory access request, to determine whether to allow the memory access request to be passed to a cache or interconnect. In the granule protection lookup, the requester-side filtering circuitry obtains granule protection information corresponding to a target granule of physical addresses including the target PA, which indicates at least one allowed PAS associated with the target granule, and blocks the memory access request when the granule protection information indicates that the selected PAS is not an allowed PAS.

21 Claims, 13 Drawing Sheets

(56) References Cited

U.S. PATENT DOCUMENTS

| | | | |
|---|---|---|---|
| 8,418,175 | B2 | 4/2013 | Mansell |
| 10,223,306 | B2* | 3/2019 | Gittins .............. G06F 12/0897 |
| 10,725,687 | B1* | 7/2020 | Sela .................... G06F 12/14 |
| 11,334,501 | B2* | 5/2022 | Ndu ..................... G06F 9/4401 |
| 2003/0149851 | A1* | 8/2003 | Shiota ............... G06F 12/1425 |
| | | | 711/E12.099 |
| 2004/0158727 | A1 | 8/2004 | Watt et al. |
| 2004/0260910 | A1 | 12/2004 | Watt |
| 2005/0102615 | A1 | 5/2005 | Roman |
| 2005/0268095 | A1 | 12/2005 | O'Connor |
| 2009/0320048 | A1 | 12/2009 | Watt et al. |
| 2013/0054896 | A1* | 2/2013 | Colavin ............. G06F 12/1458 |
| | | | 711/E12.017 |
| 2013/0283017 | A1 | 10/2013 | Wilkerson et al. |
| 2014/0108701 | A1* | 4/2014 | Liljeberg ........... G06F 9/45558 |
| | | | 711/6 |
| 2014/0380425 | A1 | 12/2014 | Lockett |
| 2018/0045189 | A1 | 2/2018 | Lee et al. |
| 2019/0042324 | A1 | 2/2019 | Chhabra et al. |
| 2020/0057664 | A1 | 2/2020 | Durham et al. |
| 2021/0073403 | A1 | 3/2021 | Swaine |

FOREIGN PATENT DOCUMENTS

| | | |
|---|---|---|
| JP | 2015-60569 | 3/2015 |
| JP | 2018-523209 | 8/2018 |
| TW | 201702888 | 1/2017 |
| TW | 201918882 | 5/2019 |
| WO | 2019/002810 | 1/2019 |
| WO | 2019/002815 A1 | 1/2019 |

OTHER PUBLICATIONS

Office Action dated Mar. 21, 2024 for U.S. Appl. No. 17/906,581, 22 pages.

Robert Bedichek, "Some Efficient Architecture Simulation Techniques," Proceedings of the Winter 1990 USENIX Conference, Jan. 22-26, 1990, 12 pages.

Combined Search and Examination Report for GB Application No. 2004258.6 dated Sep. 24, 2020, 7 pages.

International Search Report and Written Opinion of the International Searching Authority for PCT/GB2021/050173 mailed Apr. 12, 2021, 17 pages.

Arm Limited, "TrustZone® Address Space Controller" (TZC-380) Revision: r0p0, Technical Reference Manual, Mar. 19, 2010, 82 pages.

Arm Limited, "ARM Security Technology—Building a Secure System using TrustZone® Technology" Apr. 2009, 108 pages.

Arm Limited, Isolation using Visualization in the Secure world, Armv8.4, Version 1.0, 2018.

Combined Search and Examination Report for GB Application No. 2004257.8 dated Sep. 24, 2020, 8 pages.

International Search Report and Written Opinion of the International Searching Authority for PCT/GB2021/050174, mailed Apr. 23, 2021, 13 pages.

Office Action for TW Application No. 110104173 dated May 15, 2024 and English translation, 20 pages.

Office Action for JP Application No. 2022-557074 dated Jan. 7, 2025 and English translation, 8 pages.

Office Action for JP Application No. 2022-557072 issued Jan. 29, 2025 and English translation, 9 pages.

* cited by examiner

APPARATUS AND METHOD USING PLURALITY OF PHYSICAL ADDRESS SPACES

The present technique relates to the field of data processing.

A data processing system may have address translation circuitry to translate a virtual address of memory access request to a physical address corresponding to a location to be accessed in a memory system.

At least some examples provide an apparatus comprising: address translation circuitry to translate a target virtual address specified by a memory access request issued by requester circuitry into a target physical address; and requester-side filtering circuitry to perform a granule protection lookup based on the target physical address and a selected physical address space associated with the memory access request, to determine whether to allow the memory access request to be passed to a cache or passed to an interconnect for communicating with a completer device for servicing the memory access request, where said selected physical address space is one of a plurality of physical address spaces; in which: in the granule protection lookup, the requester-side filtering circuitry is configured to: obtain granule protection information corresponding to a target granule of physical addresses including the target physical address, the granule protection information indicative of at least one allowed physical address space associated with the target granule; and block the memory access request when the granule protection information indicates that the selected physical address space is not one of said at least one allowed physical address space.

At least some examples provide a data processing method comprising: translating a target virtual address specified by a memory access request issued by requester circuitry into a target physical address; and at requester-side filtering circuitry, performing a granule protection lookup based on the target physical address and a selected physical address space associated with the memory access request, to determine whether to allow the memory access request to be passed to a cache or passed to an interconnect for communicating with a completer device for servicing the memory access request, where said selected physical address space is one of a plurality of physical address spaces; in which: in the granule protection lookup, the requester-side filtering circuitry: obtains granule protection information corresponding to a target granule of physical addresses including the target physical address, the granule protection information indicative of at least one allowed physical address space associated with the target granule; and blocks the memory access request when the granule protection information indicates that the selected physical address space is not one of said at least one allowed physical address space.

At least some examples provide a computer program for controlling a host data processing apparatus to provide an instruction execution environment for execution of target code; the computer program comprising: address translation program logic to translate a target simulated virtual address specified by a memory access request into a target simulated physical address; and filtering program logic to perform a granule protection lookup based on the target simulated physical address and a selected simulated physical address space associated with the memory access request, to determine whether to allow the memory access request to be serviced, where said selected simulated physical address space is one of a plurality of simulated physical address spaces; in which: in the granule protection lookup, the filtering program logic is configured to: obtain granule protection information corresponding to a target granule of simulated physical addresses including the target simulated physical address, the granule protection information indicative of at least one allowed simulated physical address space associated with the target granule; and prevent the memory access request being serviced when the granule protection information indicates that the selected simulated physical address space is not one of said at least one allowed simulated physical address space.

At least some examples provide a computer-readable storage medium storing the computer program described above. The computer-readable storage medium may be a non-transitory storage medium or a transitory storage medium.

Further aspects, features and advantages of the present technique will be apparent from the following description of examples, which is to be read in conjunction with the accompanying drawings, in which.

Figure 4:
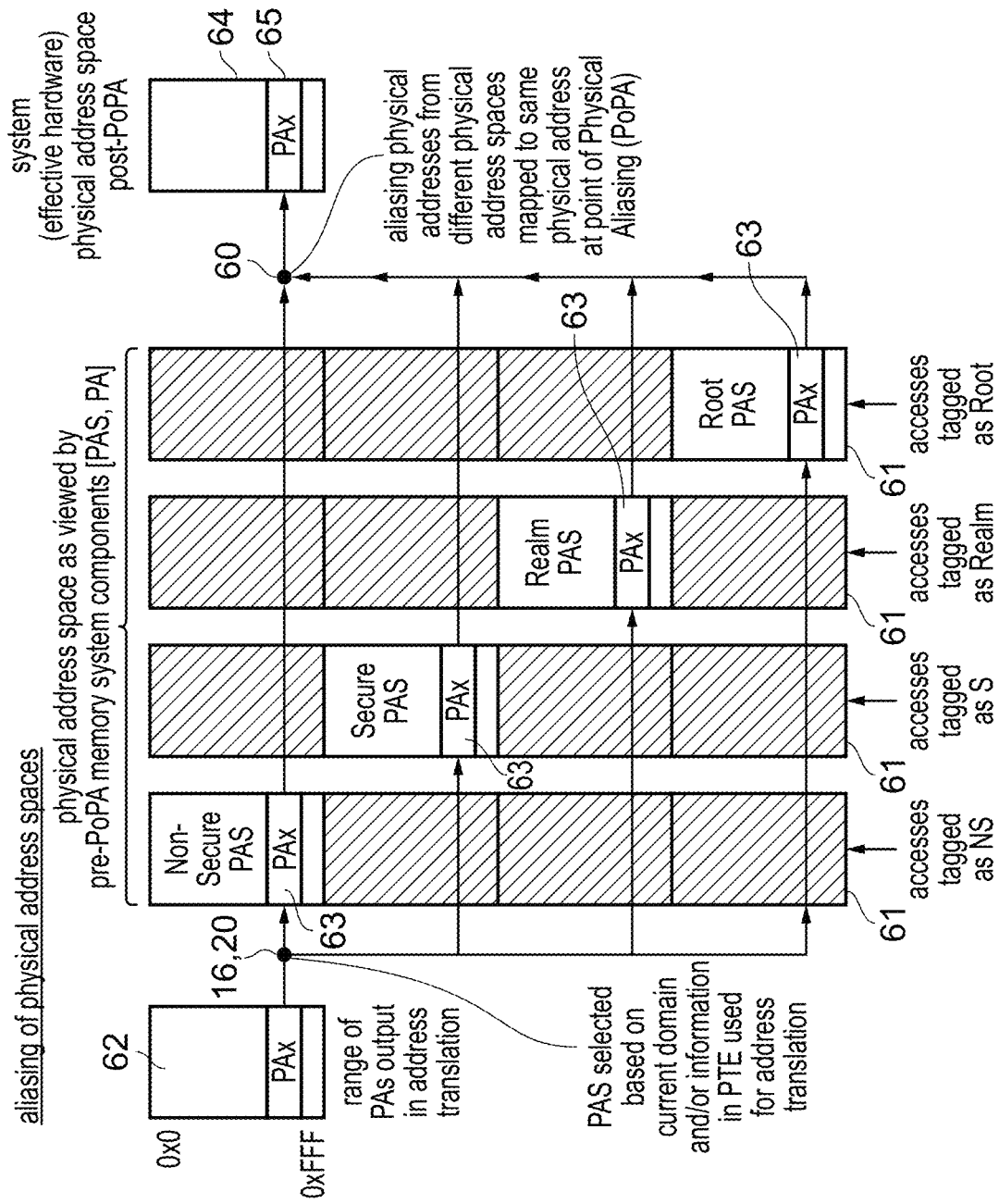
Figure 5:
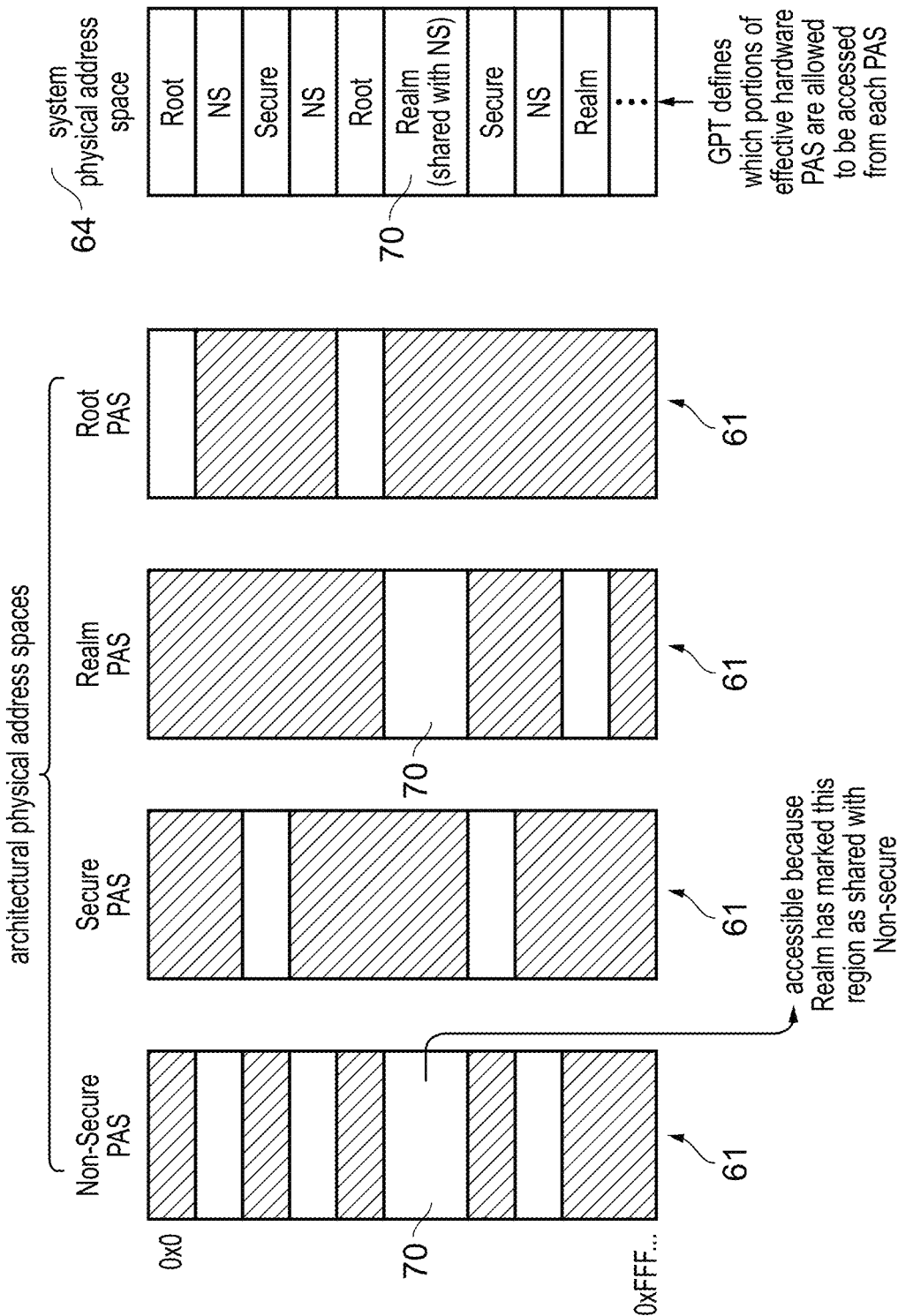
Figure 6:
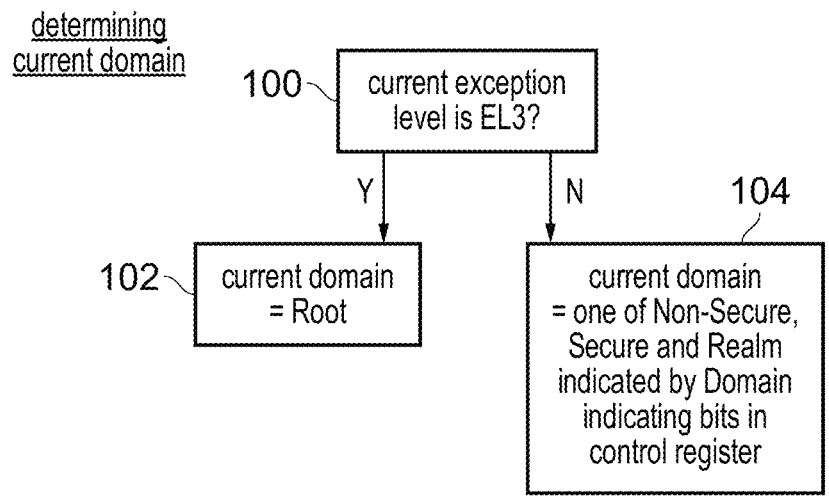
Figure 7:
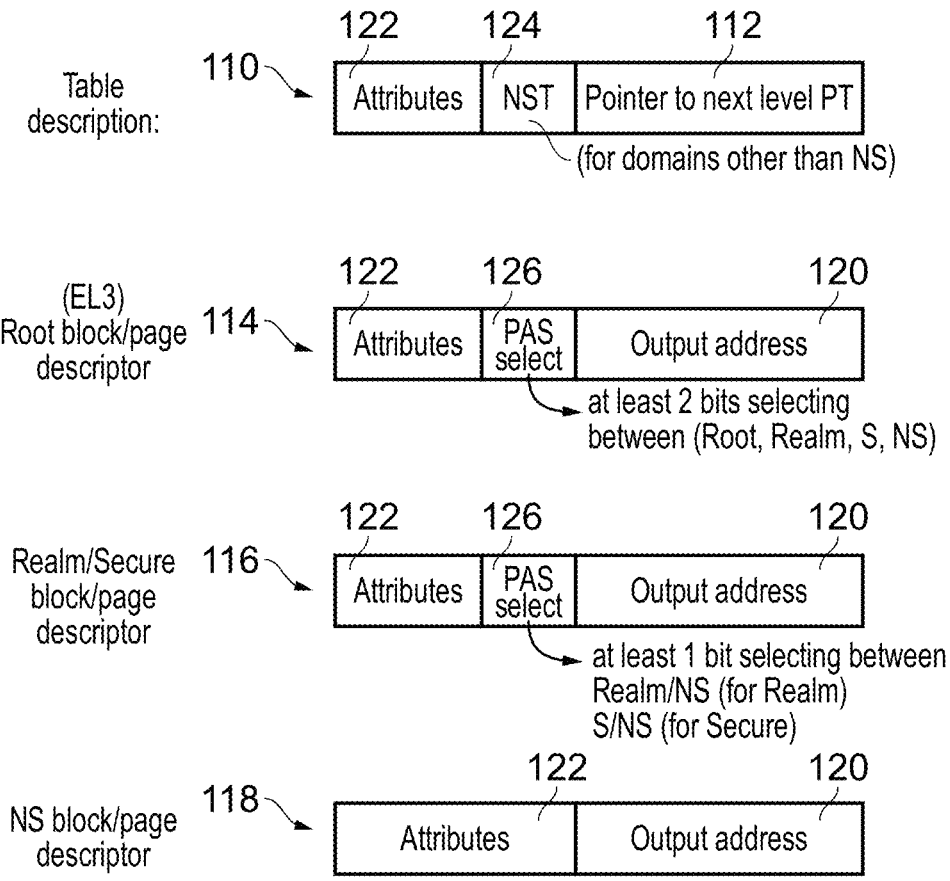
Figure 8:
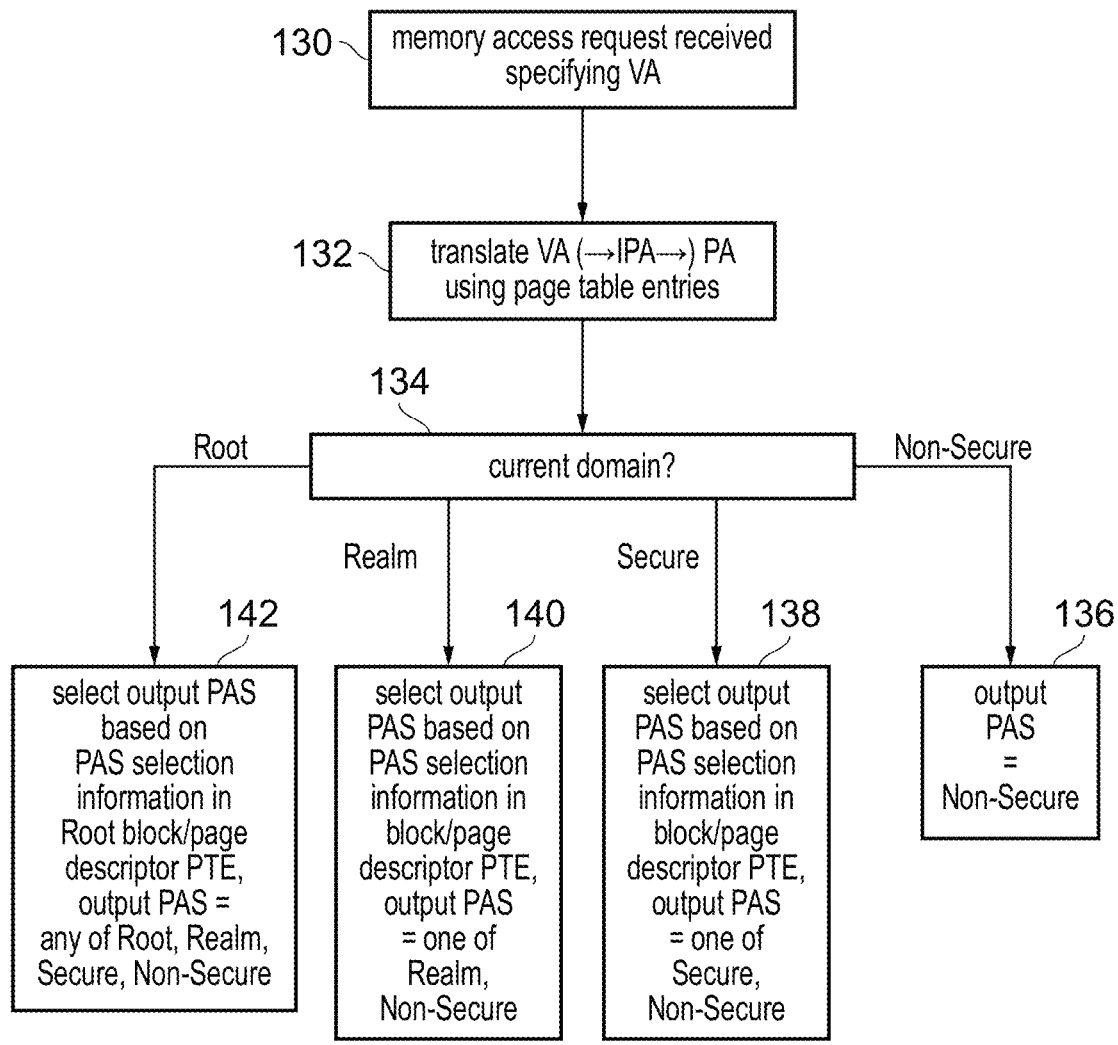
Figure 9:
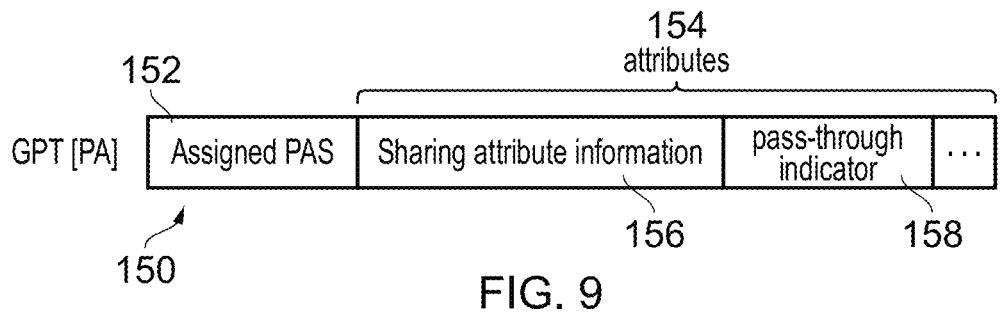
Figure 10:
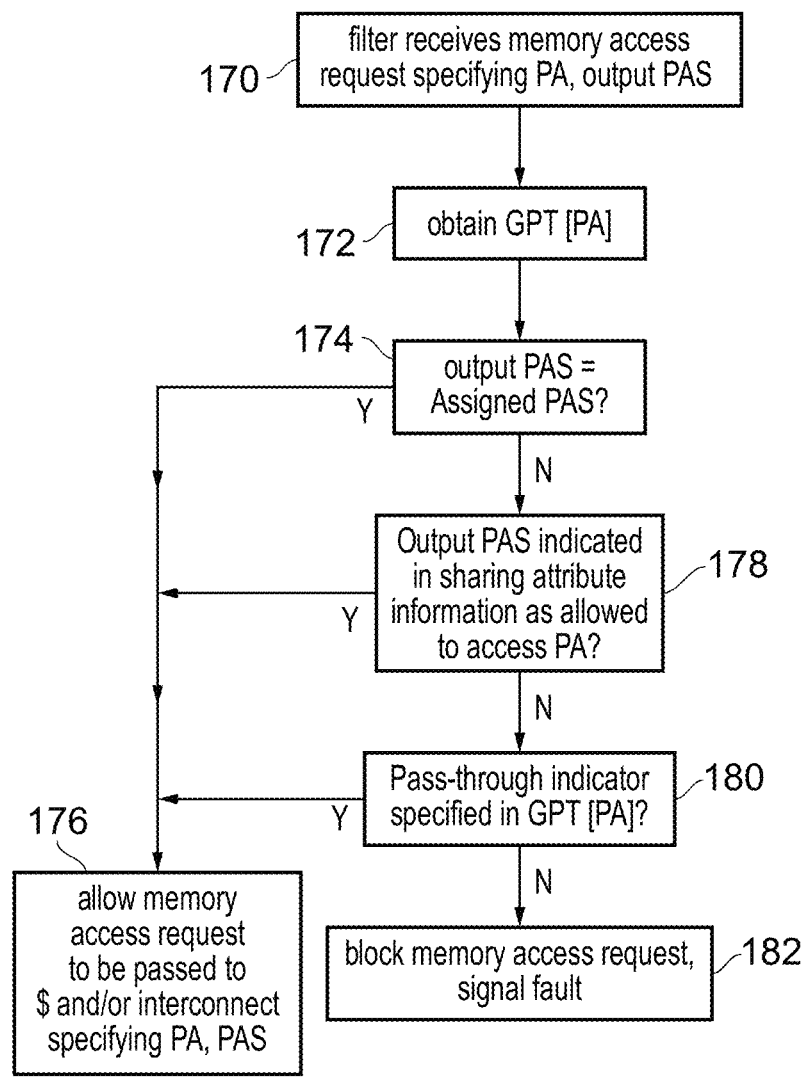
Figure 11:
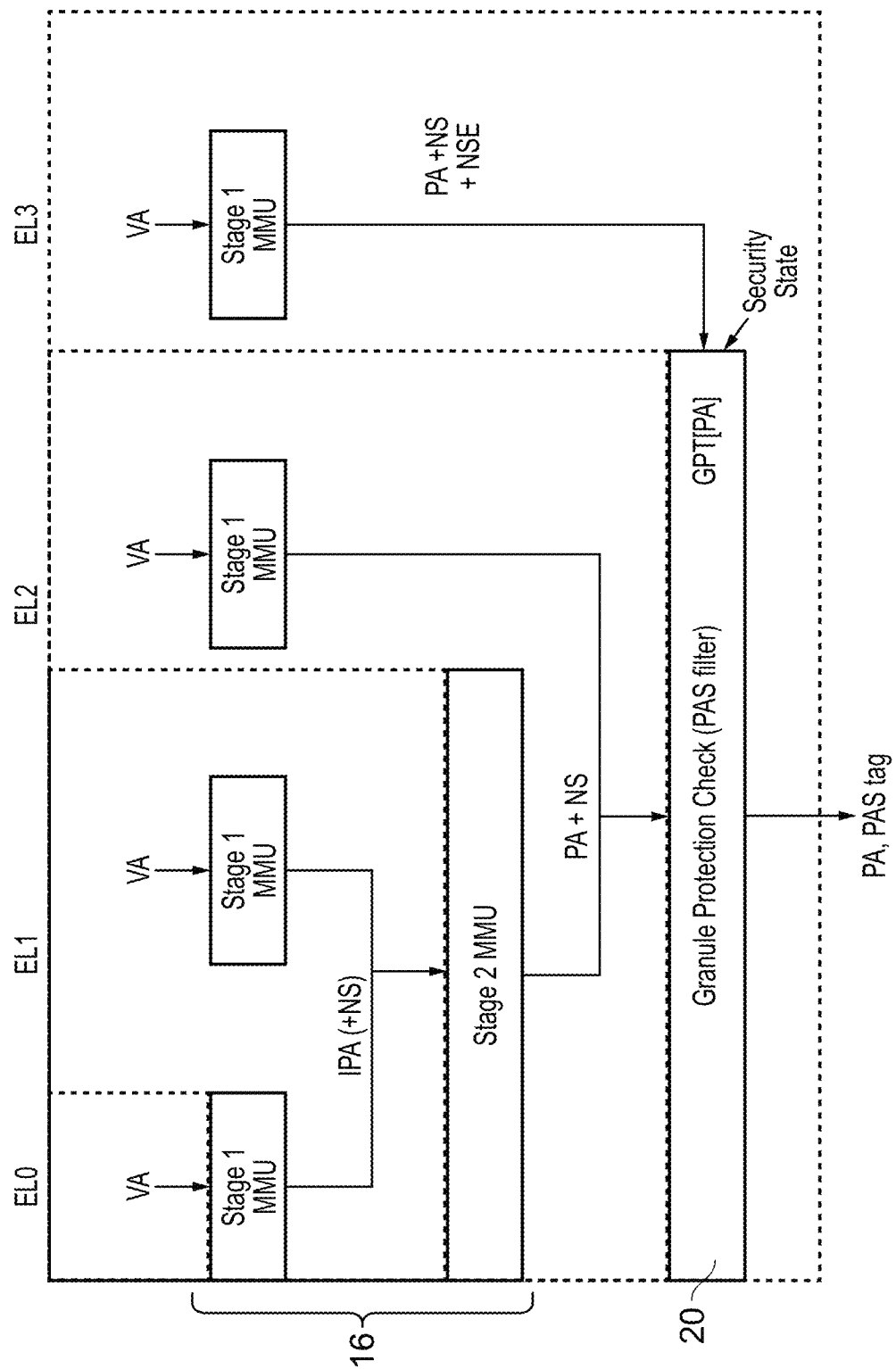
Figure 12:
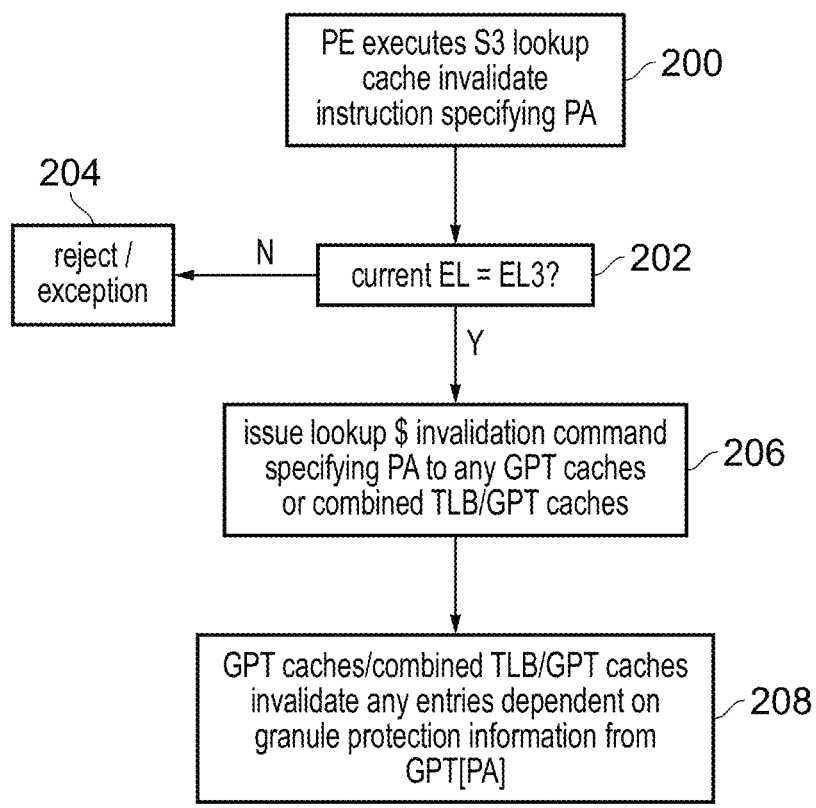
Figure 13:
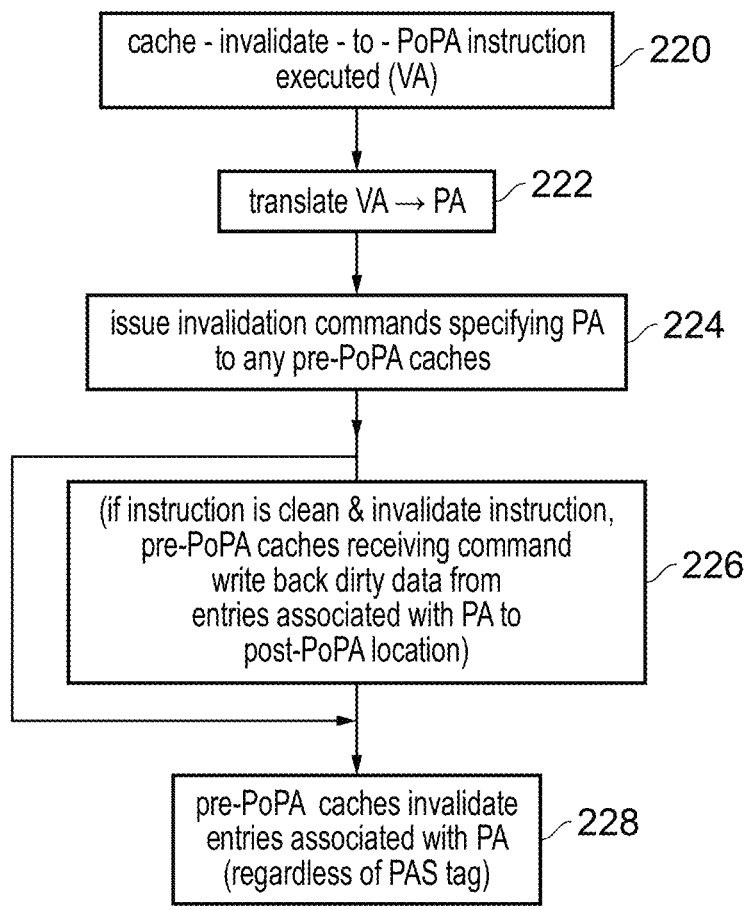
Figure 14:
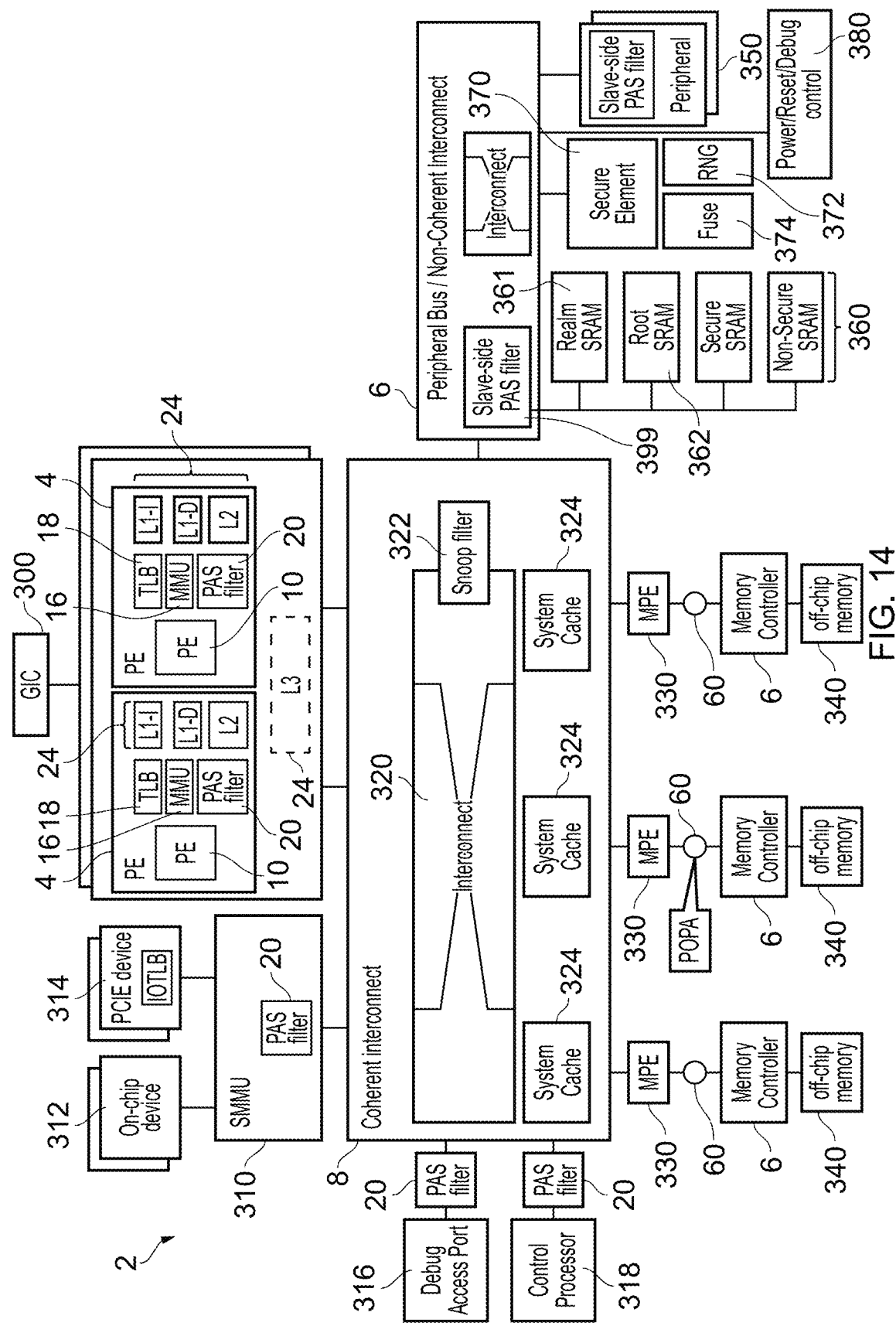

FIG. 4 schematically illustrates aliasing of a number of physical address spaces onto a system physical address space identifying locations in the memory system;

FIG. 5 illustrates an example of partitioning the effective hardware physical address space so that different architectural physical address spaces have access to respective portions of the system physical address space;

FIG. 6 is a flow diagram illustrating a method of determining the current domain of operation of the processing circuitry;

FIG. 7 shows examples of page table entry formats for page table entries used for translating virtual addresses to physical addresses;

FIG. 8 is a flow diagram showing a method of selecting a physical address space to be accessed by a given memory access request;

FIG. 9 illustrates an example of an entry of a granule protection table for providing granule protection information indicating which physical address spaces are allowed to access a given physical address;

FIG. 10 is a flow diagram showing a method of performing a granule protection lookup;

FIG. 11 illustrates a number of stages of address translation and granule protection information filtering;

FIG. 12 is a flow diagram illustrating processing of a cache invalidation instruction;

FIG. 13 is a flow diagram illustrating processing of a cache-invalidate-to-PoPA (point of physical aliasing) instruction;

FIG. 14 illustrates an example of a data processing system; and

Figure 15:
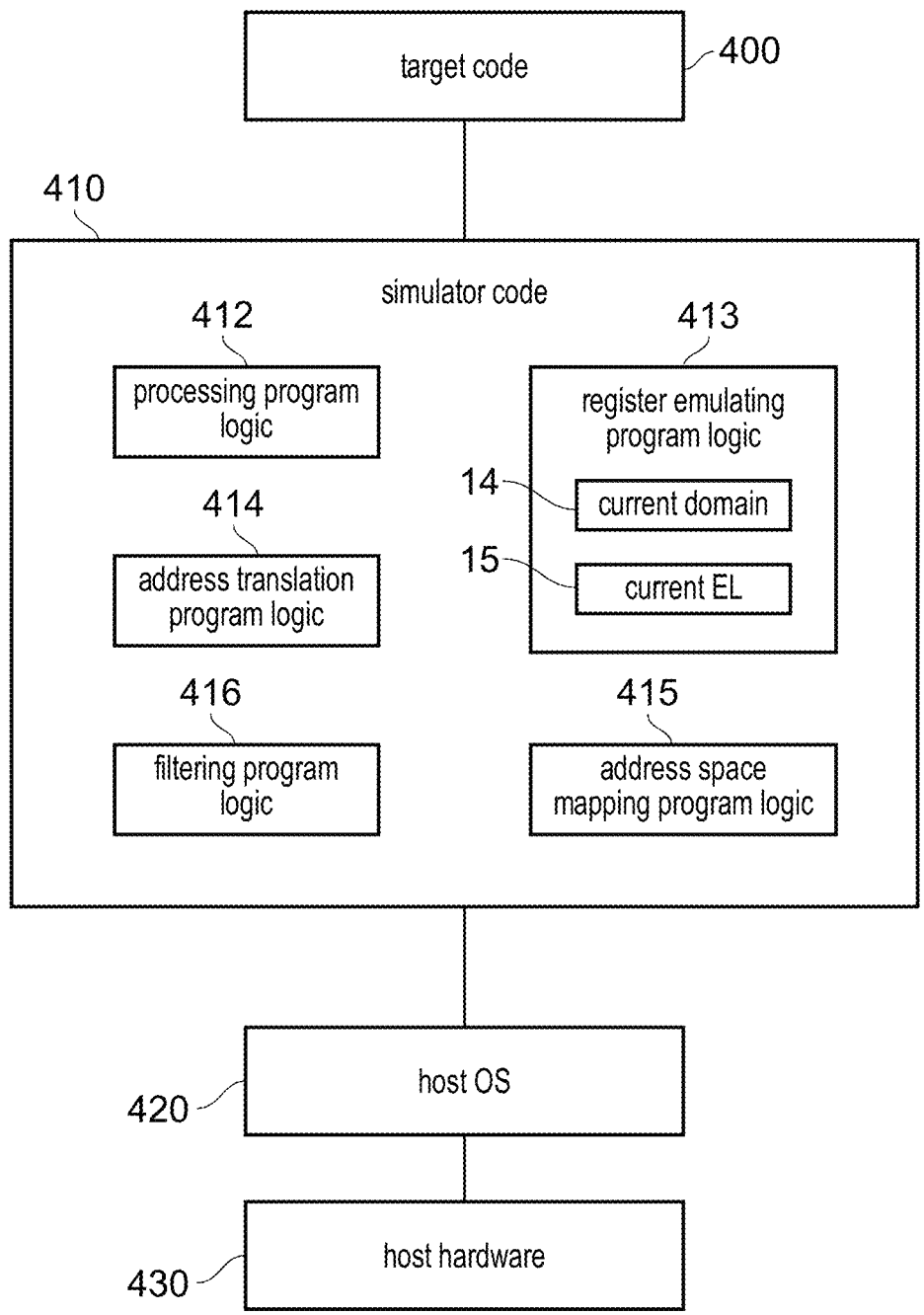

FIG. 15 shows a simulator example that may be used.

CONTROLLING ACCESS TO PHYSICAL ADDRESS SPACES

Data processing systems may support use of virtual memory, where address translation circuitry is provided to translate a virtual address specified by a memory access request into a physical address associated with a location in a memory system to be accessed. The mappings between virtual addresses and physical addresses may be defined in one or more page table structures. The page table entries within the page table structures could also define some access permission information which may control whether a given software process executing on the processing circuitry is allowed to access a particular virtual address.

In some processing systems, all virtual addresses may be mapped by the address translation circuitry onto a single physical address space which is used by the memory system to identify locations in memory to be accessed. In such a system, control over whether a particular software process can access a particular address is provided solely based on the page table structures used to provide the virtual-to-physical address translation mappings. However, such page table structures may typically be defined by an operating system and/or a hypervisor. If the operating system or the hypervisor is compromised then this may cause a security leak where sensitive information may become accessible to an attacker.

Therefore, for some systems where there is a need for certain processes to execute securely in isolation from other processes, the system may support operation in a number of domains and a number of distinct physical address spaces may be supported, where for at least some components of the memory system, memory access requests whose virtual addresses are translated into physical addresses in different physical address spaces are treated as if they were accessing completely separate addresses in memory, even if the physical addresses in the respective physical address spaces actually correspond to the same location in memory. By isolating accesses from different domains of operation of the processing circuitry into respective distinct physical address spaces as viewed for some memory system components, this can provide a stronger security guarantee which does not rely on the page table permission information set by an operating system or hypervisor.

The processing circuitry may support processing in a root domain which is responsible for managing switching between other domains in which the processing circuitry can operate. By providing a dedicated root domain for controlling the switching, this can help to maintain security by limiting the extent to which code executing in one domain can trigger a switch to another domain. For example the root domain may perform various security checks when a switch of domain is requested.

Hence, the processing circuitry may support processing being performed in one of at least three domains: the root domain, and at least two other domains. Address translation circuitry may translate a virtual address of a memory access performed from a current domain to a physical address in one of the plurality of physical address spaces selected based at least on the current domain.

In the examples described below, the plurality of physical address spaces include a root physical address space which is associated with the root domain, separate from physical address spaces associated with the other domains. Hence, rather than using one of the physical address spaces associated with one of the other domains, the root domain has its own physical address space allocated to it. By providing a dedicated root physical address space isolated from physical address spaces associated with the other domains, this can provide a stronger guarantee of security for the data or code associated with the root domain, which may be regarded as the most critical for security given that it will manage entry into other domains. Also, the provision of a dedicated root physical address space distinguished from the physical address spaces of other domains can simplify system development because it may simplify allocation of physical addresses within the respective physical address spaces to particular units of hardware memory storage. For example, by identifying a separate root physical address space it can be simpler for the data or program code associated with the root domain to be preferentially stored in a protected memory on-chip rather than in a less secure off-chip memory, with less overhead in determining the portions associated with the root domain than if the root domain's code or data was stored in a common address space shared with another domain.

The root physical address space may be exclusively accessible from the root domain. Hence, when the processing circuitry is operating in one of the other domains, the processing circuitry may not be able to access the root physical address space. This improves security by ensuring that code executing in one of the other domains cannot tamper with data or program code relied upon by the root domain for managing switching between domains or for controlling what rights the processing circuitry has when in one of the other domains.

On the other hand, all of the plurality of physical address spaces may be accessible from the root domain. As the code executing in the root domain has to be trusted by any party providing code operating in one of the other domains, as the root domain code will be responsible for the switching into that particular domain in which that party's code is executing, then inherently the root domain can be trusted to access any of the physical address spaces. Making all of the physical address spaces accessible from the root domain allows to perform functions such as transitioning memory regions into and out of the domain, copying code and data into a domain e.g. during boot, and providing services to that domain.

The address translation circuitry may restrict which physical address spaces are accessible depending on the current domain. When a particular physical address space is accessible to the current domain, this means that it is possible for the address translation circuitry to translate a virtual address specified for a memory access issued from the current domain into a physical address in that particular physical address space. This does not necessarily imply that the memory access would be allowed, as even if a particular memory access can have its virtual address translated into a physical address of a particular physical address space, there may be further checks performed to determine whether that physical address is actually allowed to be accessed within that particular physical address space. This is discussed further below with reference to granule protection information which defines the partitioning of the physical addresses between respective physical address spaces. Nevertheless, by restricting which subset of physical address spaces are accessible to the current domain, this can provide stronger guarantees of security.

In some examples the processing circuitry may support two additional domains, in addition to the root domain. For example, the other domains may comprise a secure domain associated with a secure physical address space and a less secure domain associated with a less secure physical address space. The less secure physical address space may be accessible from each of the less secure domain, the secure domain and the root domain. The secure physical address space may be accessible from the secure domain and the root domain but may be inaccessible from the less secure domain. The root domain can be accessible to the root domain but may be inaccessible to the less secure domain and the secure domain. Hence, this allows code executing in the secure domain to have its code or data protected from access by code operating in the less secure domain with stronger security guarantees than if page tables were used as the sole security controlling mechanism. For example, portions of code which require stronger security can be executed in the secure domain managed by a trusted operating system distinct from a non-secure operating system operating in the less secure domain. An example of a system supporting such secure and less secure domains may be processing systems operating according to a processing architecture which supports the TrustZone® architecture feature provided by Arm® Limited of Cambridge, UK. In conventional TrustZone® implementations the monitor code for managing switching between secure and less secure domains uses the same secure physical address space that is used by the secure domain. In contrast, by providing a root domain for managing switching of other domains and assigning a dedicated root physical address space for use by the root domain as described above, this helps to improve security and simplify system development.

However, in other examples, the other domains could include further domains, for example at least three other domains in addition to the root domain. These domains could include the secure domain and the less secure domain discussed above, but may also include at least one further domain associated with a further physical address space. The less secure physical address space may also be accessible from the further domain, while the further physical address space may be accessible from the further domain and the root domain but may be inaccessible from the less secure domain. Hence, similar to the secure domain, the further domain may be considered more secure than the less secure domain and allow further partitioning of code into respective worlds associated with distinct physical address spaces to limit their interaction.

In some examples the respective domains may have a hierarchy so that they are associated with increasing levels of privilege as the system ascends from the less secure domain, through the secure and further domains to the root domain, with the further domain being considered more privileged than the secure domain and so having access to the secure physical address space.

However, increasingly there is a desire for a software provider to be provided with a secure computing environment which limits the need to trust other software providers associated with other software executing on the same hardware platform. For example, there may be a number of uses in fields such as mobile payment and banking, enforcement of anti-cheating or piracy mechanisms in computer gaming, security enhancements for operating system platforms, secure virtual machine hosting in a cloud system, confidential computing, etc., where a party providing software code may not be willing to trust the party providing an operating system or hypervisor (components which might previously have been considered trusted). In a system supporting secure and less secure domains with respective physical address spaces, such as systems based on the TrustZone® architecture described above, with the increasing take-up of secure components operating in a secure domain, the set of software typically operating in the secure domain has grown to include a number of pieces of software which may be provided from a different number of software providers, including parties such as an original equipment manufacturer (OEM) who assembles a processing device (such as a mobile phone) from components including a silicon integrated circuit chip provided by a particular silicon provider, an operating system vendor (OSV) who provides the operating system running on the device, and a cloud platform operator (or cloud host) who maintains a server farm providing server space for hosting virtual machines on the cloud. Hence, if the domains were implemented in a strict order of increasing privilege, then there may be a problem because an application provider providing application-level code which wishes to be provided with a secure computing environment may not wish to trust a party (such as the OSV, OEM or cloud host) who might traditionally have provided software executing the secure domain, but equally the parties providing the code operating in a secure domain are unlikely to wish to trust application providers to provide code operating at a higher privilege domain which is given access to data associated with less privileged domains. Therefore, it is recognised that a strict hierarchy of domains of successively increasing privilege may not be appropriate.

Hence, in the more detailed examples below, the further domain may be considered to be orthogonal to the secure domain. While the further domain and the secure domain can each access the less secure physical address space, the further physical address space associated with the further domain is inaccessible from the secure domain, while the secure physical address space associated with the secure domain is inaccessible from the further domain. The root domain can still access the physical address spaces associated with both the secure domain and the further domain.

Hence, with this model the further domain (an example of which is the realm domain described in the examples below) and the secure domain have no dependencies upon each other and so do not need to trust each other. The secure domain and the further domain only need to trust the root domain, which is inherently trusted as it is managing the entry into the other domains.

While the examples below describe a single instance of the further domain (realm domain), it will be appreciated that the principle of a further domain orthogonal to the secure domain can be extended to provide multiple further domains so that each of the secure domain and at least two further domains can access the less secure physical address space, cannot access the root physical address space, and cannot access the physical address spaces associated with each other.

The less secure physical address space may be accessible from all of the domains supported by the processing circuitry. This is useful because it facilitates sharing of data or program code between software executing in different domains. If a particular item of data or code is to be accessible in different domains, then it can be allocated to the less secure physical address space so that it can be accessed from any of the domains.

When translating a virtual address to a physical address, the address translation circuitry may perform the translation based on at least one page table entry. At least when the current domain is one of a subset of the at least three domains supported by the processing circuitry, the address translation circuitry may select which of the physical address spaces is to be used as the physical address space into which the physical address is translated for a given memory access, based on the current domain and physical address space selection information specified in the at least one page table entry used for the translation of the virtual address to the physical address. Hence, information defined within the page table structure may influence which physical address space is selected for a given memory access when issued from the current domain. For some domains, this selection based on physical address space selection information specified in the page table entry may not be necessary. For example, if the current domain is the less secure domain described above, then as all the other address spaces may be inaccessible to the less secure domain, the less secure physical address space may be selected regardless of any information specified in the at least one page table entry used for the address translation.

However for other domains, it is possible for that domain to select between two or more different physical address spaces. Hence, for these domains it can be useful to define information in a page table entry for a given block of addresses indicating which physical address space should be used for that access, so that different parts of the virtual address space seen by a given piece of software can be mapped onto different physical addresses.

For example when the current domain is the root domain, the address translation circuitry may translate the virtual address to the physical address based on a root-domain page table entry for which the physical address space selection information comprises at least two bits of physical address space selection information for selecting between at least three physical address spaces accessible from the root domain. For example, in an implementation supporting the root domain, less secure domain and secure domain, the physical address space selection information in the root-domain page table entry could select between any of these three physical address spaces. In an implementation also having at least one further domain, the physical address space selection information may select between any of the root physical address space, secure physical address space, less secure physical address space and at least one further physical address space.

On the other hand, when the current domain is the secure domain or the further domain, the choice of physical address spaces may be more restricted and so fewer bits of physical address space selection information may be needed compared to the root domain. For example, in the secure domain the physical address space selection information may select between the secure address space and the less secure address space (as the root physical address space and further physical address space may be inaccessible). When the current domain is the further domain, the physical address space selection information may be used to select between the further physical address space and the less secure physical address space, as the secure physical address space and the root physical address space may be inaccessible. For page table entries used to select the physical address space to be used when the current domain is the secure domain or the further domain, the physical address space selection indicator used to make this selection may be encoded at a same position within the at least one page table entry regardless of whether the current domain is the secure domain or the further domain. This makes encoding of the page table entries more efficient and allows hardware for interpreting that portion of page table entries to be reused for both secure and further domains, reducing circuit area.

The memory system may include a point of physical aliasing (PoPA), which is a point at which aliasing physical addresses from different physical address spaces which correspond to the same memory system resource are mapped to a single physical address uniquely identifying that memory system resource. The memory system may include at least one pre-PoPA memory system component which is provided upstream of the PoPA, which treats the aliasing physical addresses as if they correspond to different memory system resources.

For example, the at least one pre-PoPA memory system component could include a cache or translation lookaside buffer which may cache data, program code or address translation information for the aliasing physical addresses in separate entries, so that if the same memory system resource is requested to be accessed from different physical address spaces, then the accesses will cause separate cache or TLB entries to be allocated. Also, the pre-PoPA memory system component could include coherency control circuitry, such as a coherent interconnect, snoop filter, or other mechanism for maintaining coherency between cached information at respective master devices. The coherency control circuitry could assign separate coherency states to the respective aliasing physical addresses in different physical address spaces. Hence, the aliasing physical addresses are treated as separate addresses for the purpose of maintaining coherency even if they do actually correspond to the same underlying memory system resource. Although on the face of it, tracking coherency separately for the aliasing physical addresses could appear to cause a problem of loss of coherency, in practice this is not a problem because if processes operating in different domains are really intended to share access to a particular memory system resource then they can use the less secure physical address space to access that resource (or use the restrictive sharing feature described below to access the resource using one of the other physical address spaces). Another example of a pre-PoPA memory system component may be a memory protection engine which is provided for protecting data saved to off-chip memory against loss of confidentiality and/or tampering. Such a memory protection engine could, for example, separately encrypt data associated with a particular memory system resource with different encryption keys depending on which physical address space the resource is accessed from, effectively treating the aliasing physical addresses as if they were corresponding to different memory system resources (e.g. an encryption scheme which makes the encryption dependent on the address may be used, and the physical address space identifier may be considered to be part of the address for this purpose).

Regardless of the form of the pre-PoPA memory system component, it can be useful for such a PoPA memory system component to treat the aliasing physical addresses as if they correspond to different memory system resources, as this provides hardware-enforced isolation between the accesses issued to different physical address spaces so that information associated with one domain cannot be leaked to another domain by features such as cache timing side channels or side channels involving changes of coherency triggered by the coherency control circuitry.

It may be possible, in some implementations, for the aliasing physical addresses in the different physical address spaces to be represented using different numeric physical address values for the respective different physical address spaces. This approach may require a mapping table to determine at the PoPA which of the different physical address values correspond to the same memory system resource. However, this overhead of maintaining the mapping table may be considered unnecessary, and so in some implementations it may be simpler if the aliasing physical addresses comprise physical addresses which are represented using the same numeric physical address value in each of the different physical address spaces. If this approach is taken then, at the point of physical aliasing, it can be sufficient simply to discard the physical address space identifier which identifies which physical address space is accessed using a memory access, and then to provide the remaining physical address bits downstream as a de-aliased physical address.

Hence, in addition to the pre-PoPA memory system component, the memory system may also include a PoPA memory system component configured to de-alias the plurality of aliasing physical addresses to obtain a de-aliased physical address to be provided to at least one downstream memory system component. The PoPA memory system component could be a device accessing a mapping table to find the dealiased address corresponding to the aliasing address in a particular address space, as described above. However, the PoPA component could also simply be a location within the memory system where the physical address tag associated with a given memory access is discarded so that the physical address provided downstream uniquely identifies a corresponding memory system resource regardless of which physical address space this was provided from. Alternatively, in some cases the PoPA memory system component may still provide the physical address space tag to the at least one downstream memory system component (e.g. for the purpose of enabling completer-side filtering as discussed further below), but the PoPA may mark the point within the memory system beyond which downstream memory system components no longer treat the aliasing physical addresses as different memory system resources, but consider each of the aliasing physical addresses to map the same memory system resource. For example, if a memory controller or a hardware memory storage device downstream of the PoPA receives the physical address tag and a physical address for a given memory access request, then if that physical address corresponds to the same physical address as a previously seen transaction, then any hazard checking or performance improvements performed for respective transactions accessing the same physical address (such as merging accesses to the same address) may be applied even if the respective transactions specified different physical address space tags. In contrast, for a memory system component upstream of the PoPA, such hazard checking or performance improving steps taken for transactions accessing the same physical address may not be invoked if these transactions specify the same physical address in different physical address spaces.

As mentioned above, the at least one pre-PoPA memory system component may include at least one pre-PoPA cache. This could be a data cache, an instruction cache or a unified level 2, level 3 or system cache.

The processing circuitry may support a cache-invalidate-to-PoPA instruction which specifies a target address (which could be a virtual address or a physical address). In response to the cache-invalidate-to-PoPA instruction, the processing circuitry may issue at least one invalidation command to request that at least one pre-PoPA cache invalidates one or more entries associated with the target physical address value which corresponds to the target address. In contrast, when the at least one invalidation command is issued, at least one post-PoPA cache located downstream of the PoPA may be allowed to retain one or more entries associated with the target physical address value. For the at least one pre-PoPA cache, the cache may invalidate the one or more entries associated with the target physical address value specified by the at least one invalidation command, regardless of which of the physical address spaces is associated with those entries. Therefore, even if physical addresses having the same address value in different physical address spaces are treated as if they represent different physical addresses by the pre-PoPA caches, for the purpose of handling invalidations triggered by the cache-invalidate-to-PoPA instruction, the physical address space identifier may be ignored.

Hence, a form of cache invalidation instruction can be defined which enables the processing circuitry to request that any cached entries associated with a particular physical address corresponding to a target virtual address are invalidated in any caches up to the point of physical aliasing. This form of invalidation instruction may differ from other types of invalidation instruction which may request invalidations of cached entries which affect caches up to other points of the memory system, such as up to the point of coherency (a point at which all observers (e.g. processor cores, direct memory access engines, etc.) are guaranteed to see the same copy of data associated with a given address). Providing a dedicated form of instruction which requests invalidations up to the point of physical aliasing can be useful, especially for the root domain code which may manage changes of address allocation to the respective domains. For example, when updating granule protection information which defines which physical addresses are accessible within a given physical address space, or when reallocating a particular block of physical addresses to a different physical address space, the root domain code can use the cache-invalidate-to-PoPA instruction to ensure that any data, code or other information resident within a cache, whose accessibility depends on out of date values of the granule protection information, is invalidated to ensure that subsequent memory accesses are controlled correctly based on the new granule protection information. In some examples, in addition to invalidating a cached entry, the at least one pre-PoPA cache could also clean data from that cached entry so as to write any dirty versions of data associated with the entry to be invalidated back to a location in the memory system which is beyond the PoPA. In some cases, different versions of the cache-invalidate-to-PoPA instruction could be supported to indicate whether cleaning is required or not.

Memory encryption circuitry may be provided which is responsive to a memory access request specifying a selected physical address space and a target physical address within the selected physical address space, when the target physical address is within a protected address region, to encrypt or decrypt data associated with the protected region based on one of a number of encryption keys selected depending on the selected physical address space. In some examples, the protected address region could be the entire physical address space, while other examples may apply the encryption/decryption only to certain sub-regions as the protected address region. By assigning a dedicated root physical address space separate from the physical address spaces associated with the other domains, this makes it simpler for the memory encryption circuitry to select a different encryption key for the root domain compared to other domains so as to improve security. Similarly, the selection of different encryption keys for all the other domains enables stronger isolation of code or data assets associated with a particular domain.

In one particular example, the apparatus may have at least one on-chip memory on a same integrated circuit as the processing circuitry, and all valid physical addresses in the root physical address space may be mapped to the at least one on-chip memory, as distinct from off-chip memory. This helps to improve security of the root domain. It will be appreciated that information from other domains could also be stored in on-chip memory. The provision of a separate root physical address space simplifies the allocation of memory because, whereas in an example where the root domain shares the secure physical address space with a secure domain, there may be too much data associated with the secure domain to hold all of that data in on-chip memory and it may be difficult to determine which particular pieces of data are associated with the root domain, it is much simpler to partition out the root domain's data (or code) when this is flagged with a separate physical address space identifier.

Nevertheless, in other examples it is possible for some addresses in the root physical address space to be mapped to off-chip memory. Memory encryption, integrity and freshness mechanisms can be used to protect root domain data stored off-chip.

The techniques discussed above can be implemented in a hardware apparatus which has hardware circuitry logic for implementing the functions as discussed above. Hence, the processing circuitry and the address translation circuitry may comprise hardware circuit logic. However, in other examples a computer program for controlling a host data processing apparatus to provide an instruction execution environment for execution of target code may be provided with processing program logic and address translation program logic which performs, in software, equivalent functions to the processing circuitry and address translation circuitry discussed above. This can be useful, for example, for enabling target code written for a particular instruction set architecture to be executed on a host computer which may not support that instruction set architecture. Hence, functionality expected by the instruction set architecture which is not provided by the host computer could be emulated instead by simulation software providing an equivalent instruction execution environment for the target code as would be expected if the target code had been executed on the hardware device which actually supports the instruction set architecture. Hence, the computer program providing the simulation could include processing program logic which simulates processing in one of the at least three domains described earlier, and address translation program logic which translates virtual addresses to physical addresses in one of a number of simulated physical address spaces selected based at least on the current domain. As in the hardware device, the at least three domains may include a root domain for managing switching between other domains and the root domain may have a root simulated physical address space associated with it, separate from simulated physical address spaces associated with the other domains. For the approach where a simulation of the architecture is provided, the respective physical address spaces selected by the address translation program logic are simulated physical address spaces because they do not actually correspond to physical address spaces identified by hardware components of the host computer, but would be mapped to addresses within the virtual address space of the host. Providing such a simulation can be useful for a range of purposes, for example for enabling legacy code written for one instruction set architecture to be executed on a different platform which supports a different instruction set architecture, or for assisting with software development of new software to be executed for a new version of an instruction set architecture when hardware devices supporting that new version of the instruction set architecture are not available yet (this can enable the software for the new version of the architecture to start to be developed in parallel with development of the hardware devices supporting the new version of the architecture).

Granule Protection Lookups

In a system in which a virtual address of a memory access request can be mapped to a physical address in one of two or more distinct physical address spaces, granule protection information can be used to limit which physical addresses are accessible within a particular physical address space. This can be useful for ensuring that certain physical memory locations implemented in hardware either on-chip or off-chip can be restricted for access within a particular physical address space or a particular subset of physical address spaces if desired.

In one approach for managing such restrictions, the enforcement of whether a given physical address can be accessed from a particular physical address space may be implemented using completer-side filtering circuitry provided at or near a completer device for servicing a memory access request. For example, the completer-side filtering circuitry can be associated with a memory controller or peripheral controller. In such an approach, the issuing of memory access requests to a cache, or an interconnect for routing transactions from a requester device to the completer device, may not depend on any lookup of information for defining which physical addresses are accessible within a given physical address space.

In contrast, in the examples described below, a granule protection lookup is performed by requester-side filtering circuitry which checks whether a memory access request is allowed to be passed to a cache or an interconnect, based on a lookup of granule protection information which indicates at least one allowed physical address space associated with a target granule of physical addresses to be accessed. The granules of physical address space for which respective items of granule protection information are defined may be of a particular size, which may be the same as, or different to, the size of the pages used for a page table structure used for the address translation circuitry. In some cases the granules may be of a larger size than the pages defining address translation mappings for the address translation circuitry. Alternatively, the granule protection information may be defined at the same page-level granularity as address translation information within a page table structure. Defining granule protection information at page-level granularity can be convenient as this may then allow more fine-grained control over which regions of memory storage hardware are accessible from particular physical address spaces and hence from particular domains of operations of processing circuitry.

Hence, an apparatus may have address translation circuitry to translate a target virtual address specified by a memory access request issued by requester circuitry into a target physical address, and requester-side circuitry to perform a granule protection lookup based on the target physical address and a selected physical address space associated with the memory access request, to determine whether to allow the memory access request to be passed to a cache or passed to an interconnect for communicating with a completer device for servicing the memory access request. The selected physical address space may be one of a plurality of physical address spaces. In the granule protection lookup, the requester-side filtering circuitry may be configured to:
  obtain granule protection information corresponding to a target granule of physical addresses including the target physical address, the granule protection information indicative of at least one allowed physical address space associated with the target granule; and
  block the memory access request when the granule protection information indicates that the selected physical address space is not one of said at least one allowed physical address space.

An advantage of performing a granule protection lookup at the requester-side of the interconnect instead of on the completer-side is that this can enable more fine-grained control over which physical addresses are accessible from a given physical address space than would be practical at the completer-side. This is because the completer-side may typically have relatively limited ability to access the memory system as a whole. For example, a memory controller for a given memory unit may only have access to the locations within that memory unit and may not have access to other regions of the address space. Providing more fine-grained control may rely on a more complex table of granule protection information which may be stored in the memory system and it may be more practical to access such a table from the requester side where there is more flexibility to issue memory access request to a wider subset of the memory system.

Also, performing the granule protection lookup on the requester side can help enable the ability to dynamically update granule protection information at runtime, which may not be practical for completer-side filtering circuitry which may be restricted to accessing a relatively small amount of statically defined data defined at boot-time.

Another advantage of requester-side filtering circuitry is that this would enable the interconnect to allocate different addresses within the same granule to different completer ports communicating with different completer devices (e.g. different DRAM (dynamic random access memory) units), which may be efficient for performance but may be impractical if the granule as a whole needs to be directed to the same completer unit so that the granule protection lookup can be performed on the completer side to verify whether a memory access is allowed.

Hence there may be a number of advantages to performing the granule protection lookup for distinguishing whether a particular physical address can be accessed from a particular physical address space selected for a given memory access request at the requester side instead of the completer side.

The granule protection information can be represented in different ways. In one example the granule protection could be defined in a single linearly indexed table stored at a single contiguous block of addresses, with the particular entry to be accessed within that block selected based on the target physical address. However, in practice, granule protection information may not be defined for the entire physical address space and so it may be more efficient to use a multi-level table structure for storing the granule protection information, similar to a multi-level page table used for address translation. In such a multi-level structure, a portion of the target physical address may be used to select a level one granule protection table entry which may provide a pointer identifying a location in memory storing a further level granule protection table. Another portion of the target physical address may then select which entry of that further granule protection table is to be obtained. After iterating through one or more levels of the table beyond the first level, eventually a granule protection table entry may be obtained which provides the granule protection information associated with the target physical address.

Regardless of the particular structure chosen for the table storing the granule protection information, the granule protection information may represent which of the physical address spaces is the at least one allowed physical address in a number of ways. One approach could be to provide a series of fields which each indicate whether a corresponding one of the physical address spaces is allowed to access the granule of physical addresses including the target physical address. For example, a bitmap may be defined within the granule protection information, with each bit of the bitmap indicating whether a corresponding physical address space is an allowed physical address space or a non-allowed physical address space for that granule.

However, in practice for most use cases it may be relatively unlikely that a significant number of the physical address spaces are expected to be allowed to access a given physical address. As discussed in the earlier section on controlling access to physical address spaces, a less secure physical address space could be available for selection in all domains so can be used when data or code is to be shared between the number of domains, so that it may not be necessary for a particular physical address to be mapped into all or a substantial fraction of the available physical address spaces.

Hence, a relatively efficient approach can be that the granule protection information may specify an assigned physical address space assigned to the target granule of physical addresses, and the at least one allowed physical address space may include at least the assigned physical address space designated by the granule protection information for that particular target granule. In some implementations the granule protection information may specify a single physical address space as the assigned physical address space. Hence in some cases the granule protection information may comprise an identifier of one particular physical address space which acts as the assigned physical address space allowed to access that target granule of physical addresses.

In some implementations the only physical address space allowed to access the target granule of physical addresses may be the assigned physical address space, and the target granule of physical addresses may not be allowed to be accessed from any other physical address space. This approach can be efficient for maintaining security. Access from different domains to a particular physical address space could instead be controlled through the address translation functionality, where the address translation circuitry may be able to select which particular physical address space is to be used for a given memory access, so there may not be any need to allow a granule of physical addresses to be shared between multiple physical address spaces. If only the assigned physical address space is allowed to access the target granule of physical addresses, then to enable that granule of physical addresses to be accessed from other physical address spaces, this may require an update of which physical address space is the assigned physical address space. For example, this may require the root domain described earlier to perform some processing to switch the assigned physical address space for a given granule of physical addresses. This processing may have a certain performance cost, as for example it may (for security) include overwriting each location in the given granule of physical addresses with null data or other data which is independent of a previous contents of those physical addressed locations, to ensure that processes with access to the new assigned physical address space are not able to learn anything from the data previously stored at locations associated with the given granule of physical addresses.

Hence, another approach can be that as well as identifying an assigned physical address space, the granule protection information could also comprise sharing attribute information which indicates whether at least one other physical address space other than the assigned physical address space is one of the at least one allowed physical address space. Hence, if the sharing attribute information indicates that at least one other physical address space is allowed to access the corresponding granule of physical addresses then that granule of physical addresses can be accessed from multiple physical address spaces. This could be useful for allowing code in a domain associated with one physical address space to temporarily allow one of its assigned granules of physical addresses to be visible to a domain associated with a different physical address space. This could make temporary sharing of data or code more efficient because it is not necessary to incur a potentially costly operation for changing which physical address space is the assigned physical address space. The sharing attribute information could be set directly by code executing in the domain associated with the assigned physical address space, or could be set by the root domain on request from the code executing in the domain associated with the assigned physical address space.

Where the sharing attribute information is supported, then as well as using the sharing attribute information to validate whether an address assigned to one physical address space can be accessed by requests specifying a different address space, the requester-side filtering circuitry may also transform the physical address space selected for the memory access request issued downstream to a cache or interconnect, based on the sharing attribute information. Hence, when the granule protection lookup determines that the selected physical address space is a physical address space other than the assigned physical address space which is one of said at least one allowed physical address space indicated by the sharing attribute information, the requester-side filtering circuitry may allow the memory access request to be passed to the cache or interconnect specifying the assigned physical address space instead of the selected physical address space. This means that, for the purpose of accessing downstream memory, the components prior to the PoPA treat the memory access as if it was issued specifying the assigned physical address space in the first place, so that cache entries or snoop filter entries tagged with that assigned physical address space can be accessed for the memory access request.

In some implementations, the requester-side filtering circuitry may obtain the granule protection information used for the granule protection lookup from memory each time a memory access request is checked against the granule protection information. This approach may require less hardware cost at the requester side. However, it may be relatively slow to obtain the granule protection information from memory.

Therefore, to improve performance the requester-side filtering circuitry may have access to at least one lookup cache which may cache the granule protection information, so that the granule protection lookup can be performed in the at least one lookup cache and if the required granule information is already stored in the at least one lookup cache then it is not necessary to fetch it from memory. The at least one lookup cache may in some cases be a separate cache from a translation lookaside buffer (TLB) used by the address translation circuitry for caching page table data providing mappings between virtual and physical addresses. However, in other examples the at least one lookup cache could combine caching of page table data with caching of granule protection information. Hence, the at least one lookup cache could in some cases store at least one combined translation-granule protection entry specifying information depending on both the granule protection information and at least one page table entry used by the address translation circuitry for mapping the target virtual address to the target physical address. Whether the TLB and granule protection cache are implemented as separate structures or as the single combined structure is an implementation choice and either can be used.

Regardless of which approach is used for the at least one lookup cache, the at least one lookup cache may be responsive to at least one lookup cache invalidation command which specifies an invalidation target physical address to invalidate lookup cache entries storing information which depends on granule protection information associated with a granule of physical addresses including the invalidation target physical address. In a conventional processing system having a TLB, while the TLB may typically support invalidation commands specifying a virtual address or (in a system supporting two stages of address translation, an intermediate address), it is not typically needed for TLBs to be able to identify which entry is to be invalidated using a physical address. However, when at least one lookup cache is provided to cache granule protection information, then if the granule protection information for a given granule of physical addresses changes then it may be useful to be able to invalidate any entries which depend on that information. Hence, the command may identify a particular physical address for which entries containing information depending on granule protection information are to be invalidated.

If a granule protection information cache is implemented separately from a TLB, then a TLB may need not have any capability to search entries by physical address. In this case, the granule protection information cache may respond to the cache invalidation command specifying a physical address, but the command may be ignored by the TLB.

However, if the at least one lookup cache includes a combined translation/granule protection cache whose entries are searched based on a virtual address or an intermediate address and return both the page table information associated with the virtual/intermediate address and the granule protection information associated with the corresponding physical address, then it may be useful to provide a further scheme for searching entries based on the physical address, so that the at least one lookup cache invalidation command which specifies an invalidation target physical address can be processed. Such searches by physical address would not be needed by regular lookups of the combined cache, because if the entries are combined then searching by a virtual address or an intermediate address may be sufficient to access all of the combined information for performing both the address translation and the granule protection lookup. However, on cache invalidation commands the combined cache can be searched based on a physical address to identify any entries which may need to be invalidated because they depend on granule protection information for the specified physical address.

The memory system may have a PoPA memory system component, at least one pre-PoPA memory system component and at least one post-PoPA memory system component as discussed above for the earlier examples. Hence, aliasing physical addresses within different physical address spaces may correspond to the same memory system resource identified using a de-aliased physical address when memory access requests pass beyond the point of physical aliasing, in the same way as discussed earlier. Prior to the PoPA, at least one pre PoPA memory system component treats aliasing physical addresses from different physical address spaces as if they correspond to different memory system resources which can improve security. Again, although in theory it may be possible for the aliasing physical addresses in the different physical address spaces to be identified using different numeric address values, this may be relatively complex to implement and it can be simpler if the aliasing physical addresses are represented using the same physical address value in the different physical address spaces.

Where the at least one pre-PoPA memory system component comprises at least one pre-PoPA cache, the processing circuitry may be responsive to a cache-invalidate-to-PoPA instruction specifying a target virtual address to trigger invalidations by target physical address to any pre-PoPA caches which are upstream of the point of physical aliasing, while allowing any post-PoPA caches to retain data with the target physical address (as described earlier).

The selected physical address space associated with the memory access can be selected in different ways. In some examples, the selected physical address space may be selected (either by the address translation circuitry or by the requester-side filtering circuitry) based at least on a current domain of operation of the requester circuitry from which the memory access request was issued. The selection of the selected physical address space could also depend on physical address space selection information specified in at least one page table entry used for the translation of the target virtual address to the target physical address. The selection of which physical address space is the selected physical address space may be performed as discussed earlier for the preceding examples.

The domains and physical address spaces available for a selection in the given system may be as described earlier, and may include the less secure domain, secure domain, root domain and further domain as discussed above each with corresponding physical address spaces. Alternatively, the domains/physical address spaces could include a subset of these domains. Hence, any of the features relating to any of the domains described earlier can be included in a system having the requester-side filtering circuitry.

In an implementation where the root domain has a corresponding root physical address space as described earlier, then when the current domain is the root domain, the requester-side filtering circuitry could bypass the granule protection lookup. The granule protection lookup could be unnecessary when the current domain is the root domain as the root domain may be trusted to access all regions of physical addresses and so power can be saved by skipping the granule protection lookup when in the root domain.

The granule protection information may be modifiable by software executed in the root domain. Hence, the granule protection information may be dynamically updateable at run-time. This can be an advantage for some of the realm use cases discussed, where realms providing secure execution environments may be dynamically created at runtime and allocated corresponding regions of memory reserved for the realm. Such an approach would often be unpractical using completer-side filtering only. In some implementations the root domain may be the only domain allowed to modify the granule protection information, so if other domains need a change to the granule protection information to be implemented, then they may request that the root domain modifies the granule protection information, and the root domain can then check whether to allow the request made from another domain.

Although it can be beneficial to provide requester-side filtering circuitry for performing a granule protection lookup on the requester-side before a memory access request is passed to a cache or an interconnect, there may be other scenarios in which it may be preferred for protection information (defining which physical addresses can be accessed from a given physical address space) to be checked on the completer-side of the interconnect instead. For example, while for some parts of the address space it may be desirable to provide a fine-grained page-level granularity of division of the memory hardware into regions of physical addresses accessible from different physical address spaces, for other parts of the memory system it may be preferred to allocate a large block of contiguous addresses to a single physical address space, and so the overheads of accessing a (potentially multi-level) granule protection structure stored in memory may be unjustified. If an entire memory unit (e.g. a particular DRAM module) is to be allocated to a single physical address space then it may be simpler to handle the enforcement of restriction of access to that memory unit through a completer-side check.

Therefore, in some implementations, as well as providing requester-side filtering circuitry, there may also be completer-side filtering circuitry which is responsive to a memory access request received from the interconnect specifying a target physical address and a selected physical address space, to perform a completer-side protection lookup of completer-side protection information based on the target physical address and the selected physical address space, to determine whether the memory access request is allowed to be serviced by the completer device. By providing a hybrid approach enabling some parts of memory to be protected through a requester-side filter and other parts to be protected by a completer-side filter, this allows a better balance between performance and flexibility of allocating usage of memory than could be achieved either through requester-side filtering or completer-side filtering alone.

Hence, in some implementations the granule protection information may specify a pass-through indicator indicating that the at least one allowed physical address space is to be resolved by completer-side filtering circuitry. Hence, the requester-side filtering circuitry may, in cases when the granule protection information specifies the pass-through indicator, determine whether or not to pass the memory access request to the cache or the interconnect independent of any check of whether the selected physical address space is one of the at least one allowed physical address space for the target granule of physical addresses. On the other hand, if the granule protection information accessed for the target granule does not specify the pass-through indicator, then the determination of whether the memory access request can be passed to the cache or the interconnect may depend on the check of whether the selected physical address space is one of the at least one allowed physical address space, as in this case there may not be a subsequent completer-side filtering performed after the memory access request is allowed to progress to the cache or interconnect. Hence, the pass-through indicator can enable control of a partitioning of the address space between those granules of physical addresses for which checks are to be performed requester-side and those granules for which those checks are to be performed on the completer-side, providing added flexibility for a system designer.

The completer-side protection information used by the completer-side filtering circuitry need not have the same format as the granule protection information used by the requester-side filtering circuitry. For example the completer-side filtering circuitry may be defined at a coarser granularity than the granule protection information used for the granule protection lookup by the requester-side filtering circuitry. The granule protection information may be defined in a multi-level table structure where each level of the table provides entries each corresponding to a block of memory of a given number of addresses corresponding to a power of two and so the entry of a given level of table needed for checking a given target physical address can be indexed simply by adding a multiple of a certain portion of bits from the target physical address to a base address associated with that level of the table, avoiding a need for comparing contents of the accessed entry with the target physical address to determine whether it is the correct entry. In contrast, for the completer-side protection information a smaller number of entries may be defined, each entry specifying start and end addresses (or a start address and size) of a region of memory which may correspond to a non-power of two number of addresses. This can be more suitable for defining relatively coarse-grained blocks in the completer-side protection information, but this approach may require the target physical address to be compared against the upper and lower bounds of the respective ranges of physical addresses defined in each completer-side protection information entry to determine whether any of those match the specified physical address. The indexed multi-level table approach used for the requester-side granule protection information may support a relatively large number of distinct entries so that a fine-grained mapping of physical addresses to physical address spaces is supported, which would typically not be practical using the approach of defining upper and lower bounds of each region in the completer-side protection information due to the comparison overhead in looking up each of those entries to check whether a target address falls within the bounds of that entry, but the completer-side protection information may be more efficient in terms of memory storage and may be less variable in terms of performance as there is less of a penalty if there is a miss in a lookup cache. Of course this is just one example of how the looked up information could be implemented on the requester side and the completer side.

The requester-side protection information may be dynamically updateable at run-time. The completer-side protection information could be either statically defined by hardware on the system-on-chip, configured at boot time, or dynamically re-configured at run-time.

As for the earlier described examples, although the techniques described above for the granule protection lookup can be implemented in a system having dedicated hardware logic for performing the functions of the address translation circuitry and the requester-side filtering circuitry, the equivalent functions could also be implemented in software within in computer program for controlling host data apparatus to provide an instruction execution environment for execution of target code, for similar reasons to those described earlier. Hence, address translation program logic and filtering program logic may be provided to emulate the functionality of the address translation circuitry and requester-side filter described earlier. As for the earlier examples, for the computer program providing the instruction execution environment, at least one of the following may apply: the granule protection information is dynamically updatable by the target code at runtime; and the granule protection information is defined at page-level granularity.

Description of Examples

Figure 1:
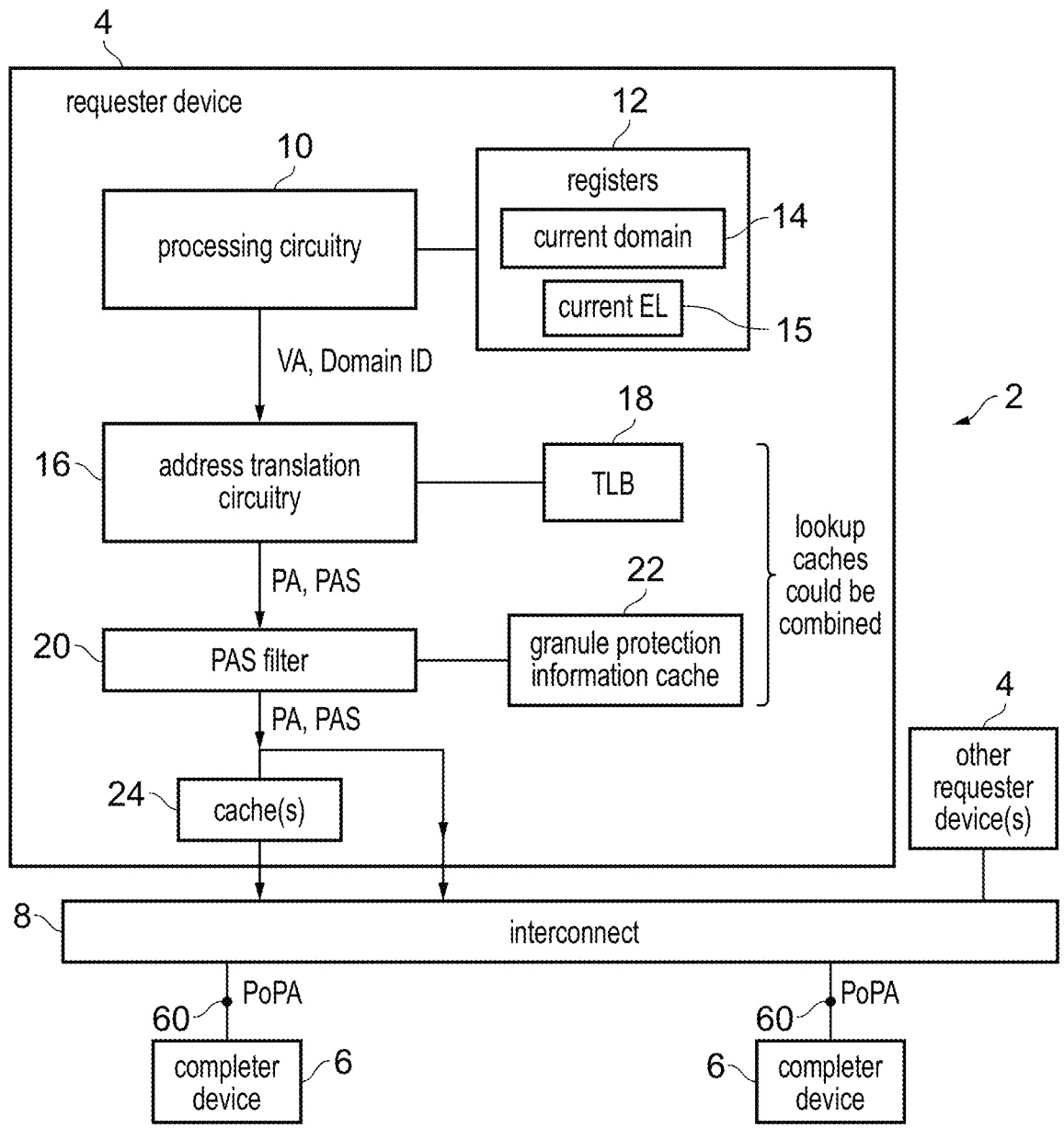
FIG. 1 illustrates an example of a data processing apparatus.

FIG. 1 schematically illustrates an example of a data processing system 2 having at least one requester device 4 and at least one completer device 6. An interconnect 8 provides communication between the requester devices 4 and completer devices 6. A requester device is capable of issuing memory access requests requesting a memory access to a particular addressable memory system location. A completer device 6 is a device that has responsibility for servicing memory access requests directed to it. Although not shown in FIG. 1, some devices may be capable of acting both as a requester device and as a completer device. The requester devices 4 may for example include processing elements such as a central processing unit (CPU) or graphics processing unit (GPU) or other master devices such as bus master devices, network interface controllers, display controllers, etc. The completer devices may include memory controllers responsible for controlling access to corresponding memory storage units, peripheral controllers for controlling access to a peripheral device, etc. FIG. 1 shows an example configuration of one of the requester devices 4 in more detail but it will be appreciated that the other requester devices 4 could have a similar configuration. Alternatively, the other requester devices may have a different configuration to the requester device 4 shown on the left of FIG. 1.

The requester device 4 has processing circuitry 10 for performing data processing in response to instructions, with reference to data stored in registers 12. The registers 12 may include general purpose registers for storing operands and results of processed instructions, as well as control registers for storing control data for configuring how processing is performed by the processing circuitry. For example the control data may include a current domain indication 14 used to select which domain of operation is the current domain, and a current exception level indication 15 indicating which exception level is the current exception level in which the processing circuitry 10 is operating.

The processing circuitry 10 may be capable of issuing memory access requests specifying a virtual address (VA) identifying the addressable location to be accessed and a domain identifier (Domain ID or 'security state') identifying the current domain. Address translation circuitry 16 (e.g. a memory management unit (MMU)) translates the virtual address into a physical address (PA) through one of more stages of address translation based on page table data defined in page table structures stored in the memory system. A translation lookaside buffer (TLB) 18 acts as a lookup cache for caching some of that page table information for faster access than if the page table information had to be fetched from memory each time an address translation is required. In this example, as well as generating the physical address, the address translation circuitry 16 also selects one of a number of physical address spaces associated with the physical address and outputs a physical address space (PAS) identifier identifying the selected physical address space. Selection of the PAS will be discussed in more detail below.

A PAS filter 20 acts as requester-side filtering circuitry for checking, based on the translated physical address and the PAS identifier, whether that physical address is allowed to be accessed within the specified physical address space identified by the PAS identifier. This lookup is based on granule protection information stored in a granule protection table structure stored within the memory system. The granule protection information may be cached within a granule protection information cache 22, similar to a caching of page table data in the TLB 18. While the granule protection information cache 22 is shown as a separate structure from the TLB 18 in the example of FIG. 1, in other examples these types of lookup caches could be combined into a single lookup cache structure so that a single lookup of an entry of the combined structure provides both the page table information and the granule protection information. The granule protection information defines information restricting the physical address spaces from which a given physical address can be accessed, and based on this lookup the PAS filter 20 determines whether to allow the memory access request to proceed to be issued to one or more caches 24 and/or the interconnect 8. If the specified PAS for the memory access request is not allowed to access the specified physical address then the PAS filter 20 blocks the transaction and may signal a fault.

While FIG. 1 shows an example with a system having multiple requester devices 4, the features shown for the one requester device on the left hand side of FIG. 1 could also be included in a system where there is only one requester device, such as a single-core processor.

While FIG. 1 shows an example where selection of the PAS for a given request is performed by the address translation circuitry 16, in other examples information for determining which PAS to select can be output by the address translation circuitry 16 to the PAS filter 20 along with the PA, and the PAS filter 20 may select the PAS and check whether the PA is allowed to be accessed within the selected PAS.

The provision of the PAS filter 20 helps to support a system which can operate in a number of domains of operation each associated with its own isolated physical address space where, for at least part of the memory system (e.g. for some caches or coherency enforcing mechanisms such as a snoop filter), the separate physical address spaces are treated as if they refer to completely separate sets of addresses identifying separate memory system locations, even if addresses within those address spaces actually refer to the same physical location in the memory system. This can be useful for security purposes.

Figure 2:
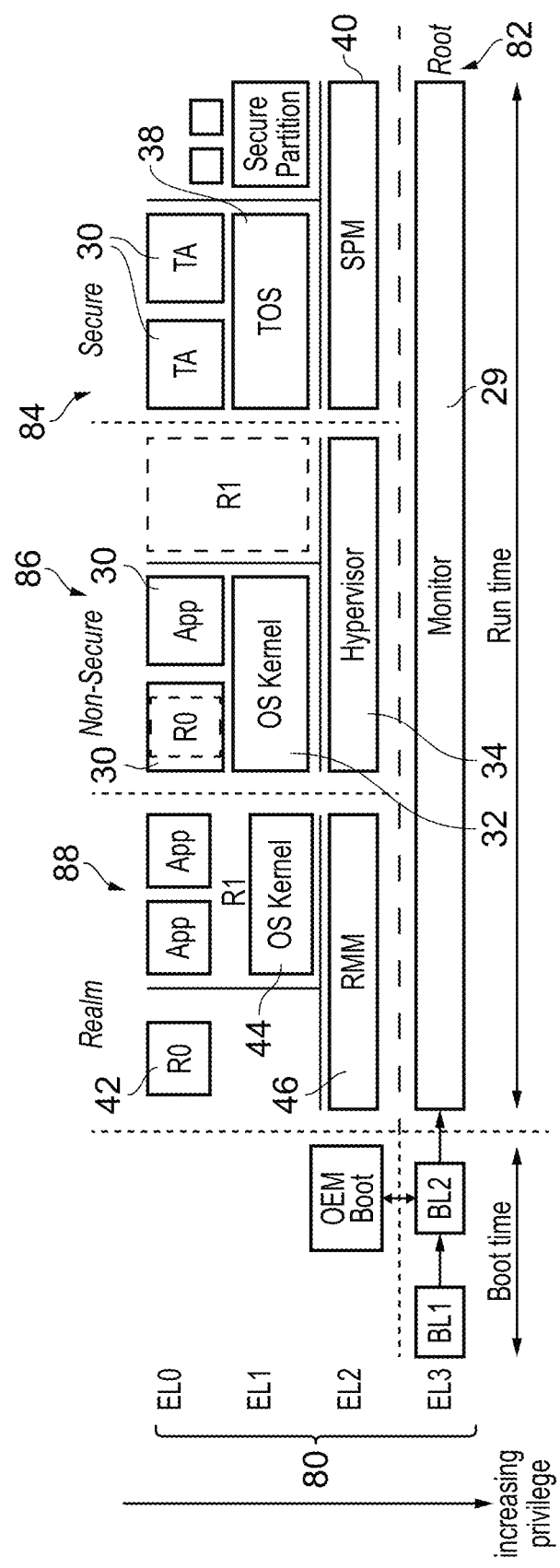
FIG. 2 illustrates a number of domains in which processing circuitry can operate.

FIG. 2 shows an example of different operating states and domains in which the processing circuitry 10 can operate, and an example of types of software which could be executed in the different exception levels and domains (of course, it will be appreciated that the particular software installed on a system is chosen by the parties managing that system and so is not an essential feature of the hardware architecture).

The processing circuitry 10 is operable at a number of different exception levels 80, in this example four exception levels labelled EL0, EL1, EL2 and EL3, where in this example EL3 refers to the exception level with the greatest level of privilege while EL0 refers to the exception level with the least privilege. It will be appreciated that other architectures could choose the opposite numbering so that the exception level with the highest number could be considered to have the lowest privilege. In this example the least privileged exception level EL0 is for application-level code, the next most privileged exception level EL1 is used for operating system-level code, the next most privileged exception level EL2 is used for hypervisor-level code which manages switching between a number of virtualised operating systems, while the most privileged exception level EL3 is used for monitor code which manages switches between respective domains and allocation of physical addresses to physical address spaces, as described later.

When an exception occurs while processing software in a particular exception level, for some types of exceptions, the exception is taken to a higher (more privileged) exception level, with the particular exception level in which the exception is to be taken being selected based on attributes of the particular exception which occurred. However, it may be possible for other types of exceptions to be taken at the same exception level as the exception level associated with the code being processed at the time an exception was taken, in some situations. When an exception is taken, information characterising the state of the processor at the time the exception was taken may be saved, including for example the current exception level at the time the exception was taken, and so once an exception handler has been processed to deal with the exception, processing may then return to the previous processing and the saved information can be used to identify the exception level to which processing should return.

In addition to the different exception levels, the processing circuitry also supports a number of domains of operation including a root domain 82, a secure (S) domain 84, a less secure domain 86 and a realm domain 88. For ease of reference, the less secure domain will be described below as the "non-secure" (NS) domain, but it will be appreciated that this is not intended to imply any particular level of (or lack of) security. Instead, "non-secure" merely indicates that the non-secure domain is intended for code which is less secure than code operating in the secure domain. The root domain 82 is selected when the processing circuitry 10 is in the highest exception level EL3. When the processing circuitry is in one of the other exception levels EL0 to EL2, the current domain is selected based on the current domain indicator 14, which indicates which of the other domains 84, 86, 88 is active. For each of the other domains 84, 86, 88 the processing circuitry could be in any of the exception levels EL0, EL1 or EL2.

At boot time, a number of pieces of boot code (e.g. BL1, BL2, OEM Boot) may be executed, e.g. within the more privileged exception levels EL3 or EL2. The boot code BL1, BL2 may be associated with the root domain for example and the OEM boot code may operate in the Secure domain. However, once the system is booted, at runtime the processing circuitry 10 may be considered to operate in one of the domains 82, 84, 86 and 88 at a time. Each of the domains 82 to 88 is associated with its own associated physical address space (PAS) which enables isolation of data from the different domains within at least part of the memory system. This will be described in more detail below.

The non-secure domain 86 can be used for regular application-level processing, and for the operating system and hypervisor activity for managing such applications. Hence, within the non-secure domain 86, there may be application code 30 operating at EL0, operating system (OS) code 32 operating at EL1 and hypervisor code 34 operating at EL2.

The secure domain 84 enables certain system-on-chip security, media or system services to be isolated into a separate physical address space from the physical address space used for non-secure processing. The secure and non-secure domains are not equal, in the sense that the non-secure domain code cannot access resources associated with the secure domain 84, while the secure domain can access both secure and non-secure resources. An example of a system supporting such partitioning of secure and non-secure domains 84, 86 is a system based on the TrustZone® architecture provided by Arm® Limited. The secure domain can run trusted applications 36 at EL0, a trusted operating system 38 at EL1, as well as optionally a secure partition manager 40 at EL2 which may, if secure partitioning is supported, use stage 2 page tables to support isolation between different trusted operating systems 38 executing in the secure domain 84 in a similar way to the way that the hypervisor 34 may manage isolation between virtual machines or guest operating systems 32 executing in the non-secure domain 86.

Extending the system to support a secure domain 84 has become popular in recent years because it enables a single hardware processor to support isolated secure processing, avoiding the need for the processing to be performed on a separate hardware processor. However, with the increasing popularity of use of the secure domain, many practical systems having such a secure domain now support, within the secure domain, a relatively sophisticated mixed environment of services which are provided by a wide range of different software providers. For example the code operating in the secure domain 84 may include different pieces of software provided by (among others): the silicon provider who manufactured the integrated circuit, an original equipment manufacturer (OEM) who assembles the integrated circuit provided by the silicon provider into an electronic device such as a mobile telephone, an operating system vendor (OSV) who provides the operating system 32 for the device; and/or a cloud platform provider who manages a cloud server supporting services for a number of different clients through the cloud.

However, increasingly there is a desire for parties providing user-level code (which might normally be expected to execute as applications 30 within the non-secure domain 86) to be provided with secure computing environments which can be trusted not to leak information to other parties operating code on the same physical platform. It may be desirable for such secure computing environments to be dynamically allocatable at runtime, and to be certified and attestable so that the user is able to verify whether sufficient security guarantee is provided on the physical platform, before trusting the device to process potentially sensitive code or data. A user of such software may not wish to trust the party providing a rich operating system 32 or hypervisor 34 which might normally operate in the non-secure domain 86 (or even if those providers themselves can be trusted, the user may wish to protect themselves against the operating system 32 or hypervisor 34 being compromised by an attacker). Also, while the secure domain 84 could be used for such user-provided applications needing secure processing, in practice this causes problems both for the user providing the code requiring the secure computing environment and for the providers of existing code operating within the secure domain 84. For the providers of existing code operating within the secure domain 84, the addition of arbitrary user-provided code within the secure domain would increase the attack surface for potential attacks against their code, which may be undesirable, and so allowing users to add code into the secure domain 84 may be strongly discouraged. On the other hand, the user providing the code requiring the secure computing environment may not be willing to trust all of the providers of the different pieces of code operating in the secure domain 84 to have access to its data or code, if certification or attestation of the code operating in a particular domain is needed as a prerequisite for the user-provided code to perform its processing, it may be difficult to audit and certify all of the distinct pieces of code operating in the secure domain 84 provided by the different software providers, which may limit the opportunities for third parties to provide more secure services.

Therefore, as shown in FIG. 2, an additional domain 88, called the realm domain, is provided which can be used by such user-introduced code to provide a secure computing environment orthogonal to any secure computing environment associated with components operating in the secure domain 24. In the realm domain, the software executed can include a number of realms, where each realm can be isolated from other realms by a realm management module (RMM) 46 operating at exception level EL2. The RMM 46 may control isolation between the respective realms 42, 44 executing the realm domain 88, for example by defining access permissions and address mappings in page table structures similar to the way in which hypervisor 34 manages isolation between different components operating in the non-secure domain 86. In this example, the realms include an application-level realm 42 which executes at EL0 and an encapsulated application/operating system realm 44 which executes across exception levels EL0 and EL1. It will be appreciated that it is not essential to support both EL0 and EL0/EL1 types of realms, and that multiple realms of the same type could be established by the RMM 46.

The realm domain 88 has its own physical address space allocated to it, similar to the secure domain 84, but the realm domain is orthogonal to the secure domain 84 in the sense that while the realm and secure domains 88, 84 can each access the non-secure PAS associated with the non-secure domain 86, the realm and secure domains 88, 84 cannot access each other's physical address spaces. This means that code executing in the realm domain 88 and secure domains 84 have no dependencies on each other. Code in the realm domain only needs to trust the hardware, the RMM 46 and the code operating in the root domain 82 which manages switching between domains, which means attestation and certification becomes more feasible. Attestation enables a given piece of software to request verification that code installed on the device matches certain anticipated properties. This could be implemented by checking whether a hash of the program code installed on the device matches an expected value that is signed by a trusted party using a cryptographic protocol. The RMM 46 and monitor code 29 could for example be attested by checking whether a hash of this software matches an expected value signed by a trusted party, such as the silicon provider who manufactured the integrated circuit comprising the processing system 2 or an architecture provider who designed the processor architecture which supports the domain-based memory access control. This can allow user-provided code 42, 44 to verify whether the integrity of the domain-based architecture can be trusted prior to executing any secure or sensitive functions.

Hence, it can be seen that the code associated with realms 42, 44, which would previously have executed in the non-secure domain 86 as shown by the dotted lines showing the gap in the non-secure domain where these processes would previously have executed, can now be moved to the realm domain where they may have stronger security guarantees because their data and code is not accessible by other code operating in a non-secure domain 86. However, due to the fact that the realm domain 88 and secure domain 84 are orthogonal and so cannot see each other's physical address spaces, this means that the providers of code in the realm domain do not need to trust the providers of code in the secure domain and vice versa. The code in the realm domain can simply trust the trusted firmware providing the monitor code 29 for the root domain 82 and the RMM 46, which may be provided by the silicon provider or the provider of the instruction set architecture supported by the processor, who may already inherently need to be trusted when the code is executing on their device, so that no further trust relationships with other operating system vendors, OEMs or cloud hosts are needed for the user to be able to be provided with a secure computing environment.

This can be useful for a range of applications and use cases, including for example mobile wallet and payment applications, gaming anti-cheating and piracy mechanisms, operating system platform security enhancements, secure virtual machine hosting, confidential computing, networking, or gateway processing for Internet of Things devices. It will be appreciated that users may find many other applications where the realm support is useful.

To support the security guarantees provided to a realm, the processing system may support an attestation report function, where at boot time or at run time measurements are made of firmware images and configuration, e.g. monitor code images and configuration or RMM code images and configuration and at runtime realm contents and configuration are measured, so that the realm owner can trace the relevant attestation report back to known implementations and certifications to make a trust decision on whether to operate on that system.

As shown in FIG. 2, a separate root domain 82 is provided which manages domain switching, and that root domain has its own isolated root physical address space. The creation of the root domain and the isolation of its resources from the secure domain allows for a more robust implementation even for systems which only have the non-secure and secure domains 86, 84 but do not have the realm domain 88, but can also be used for implementations which do support the realm domain 88. The root domain 82 can be implemented using monitor software 29 provided by (or certified by) the silicon provider or the architecture designer, and can be used to provide secure boot functionality, trusted boot measurements, system-on-chip configuration, debug control and management of firmware updates of firmware components provided by other parties such as the OEM. The root domain code can be developed, certified and deployed by the silicon provider or architecture designer without dependencies on the final device. In contrast the secure domain 84 can be managed by the OEM for implementing certain platform and security services. The management of the non-secure domain 86 may be controlled by an operating system 32 to provide operating system services, while the realm domain 88 allows the development of new forms of trusted execution environments which can be dedicated to user or third party applications while being mutually isolated from existing secure software environments in the secure domain 84.

Figure 3:
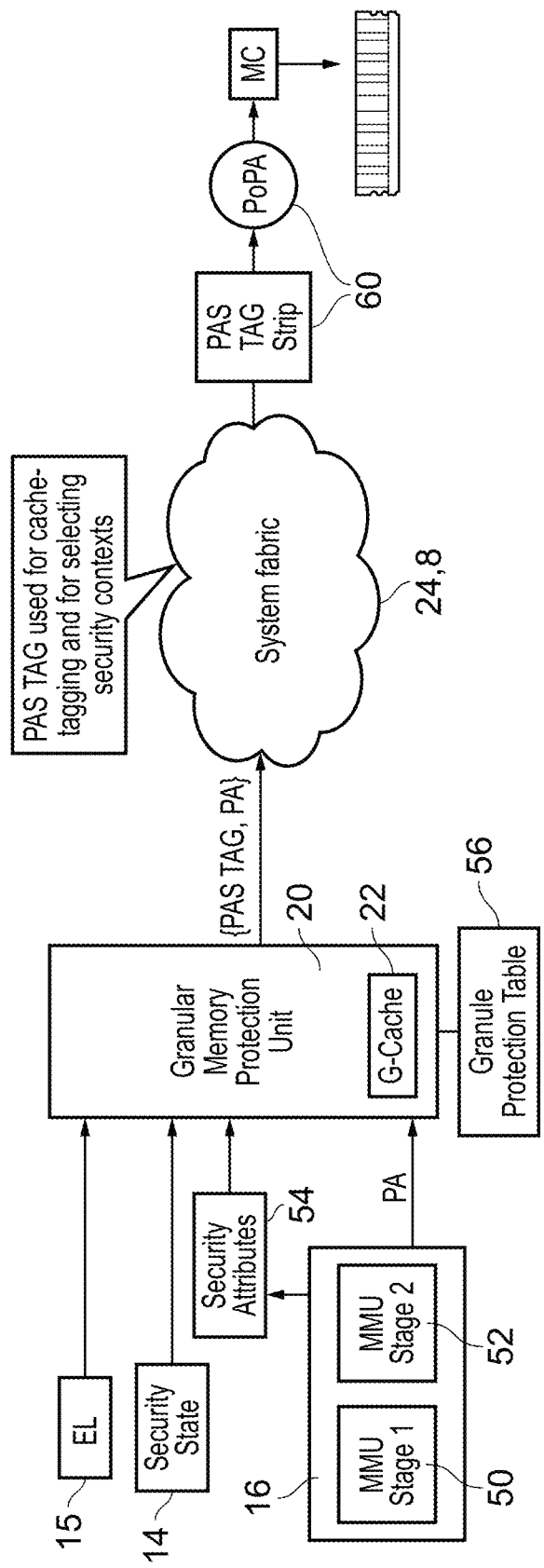
FIG. 3 illustrates an example of a processing system supporting granule protection lookups.

FIG. 3 schematically illustrates another example of a processing system 2 for supporting these techniques. Elements which are the same as in FIG. 1 are illustrated with the same reference numeral. FIG. 3 shows more detail in the address translation circuitry 16, which comprises stage 1 and stage 2 memory management units 50, 52. The stage 1 MMU 50 may be responsible for translating virtual addresses to either physical addresses (when the translation is triggered by EL2 or EL3 code) or to intermediate addresses (when the translation is triggered by EL0 or EL1 code in an operating state where a further stage 2 translation by the stage 2 MMU 52 is required). The stage 2 MMU may translate intermediate addresses into physical addresses. The stage 1 MMU may be based on page tables controlled by an operating system for translations initiated from EL0 or EL1, page tables controlled by a hypervisor for translations from EL2, or page tables controlled by monitor code 29 for translations from EL3. On the other hand, the stage 2 MMU 52 may be based on page table structures defined by a hypervisor 34, RMM 46 or secure partition manager 14 depending on which domain is being used. Separating the translations into two stages in this way allows operating systems to manage address translation for themselves and applications under the assumption that they are the only operating system running on the system, while the RMM 46, hypervisor 34 or SPM 40 may manage isolation between different operating systems running in the same domain.

As shown in FIG. 3, the address translation process using the address translation circuitry 16 may return security attributes 54 which, in combination with the current exception level 15 and the current domain 14 (or security state), allow section of a particular physical address space (identified by a PAS identifier or "PAS TAG") to be accessed in response to a given memory access request. The physical address and PAS identifier may be looked up in a granule protection table 56 which provides the granule protection information described earlier. In this example the PAS filter 20 is shown as a granular memory protection unit (GMPU) which verifies whether the selected PAS is allowed to access the requested physical address and if so allows the transaction to be passed to any caches 24 or interconnect 8 which are part of the system fabric of the memory system.

The GMPU 20 allows assigning memory to separate address spaces while providing a strong, hardware-based, isolation guarantee and providing spatial and temporal flexibility in the assignment methods of physical memory into these address spaces, as well as efficient sharing schemes. As described earlier, the execution units in the system are logically partitioned to virtual execution states (domains or "Worlds") where there is one execution state (Root world) located at the highest exception level (EL3), referred to as the "Root World" that manages physical memory assignment to these worlds.

A single System physical address space is virtualized into multiple "Logical" or "Architectural" Physical Address Spaces (PAS) where each such PAS is an orthogonal address space with independent coherency attributes. A System Physical Address is mapped to a single "Logical" Physical Address Space by extending it with a PAS tag.

A given World is allowed access to a subset of Logical Physical Address Spaces. This is enforced by a hardware filter 20 that can be attached to the output of the Memory Management Unit 16.

A World defines the security attributes (the PAS tag) of the access using fields in the Translation Table Descriptor of the page tables used for address translation. The hardware filter 20 has access to a table (Granule Protection Table 56, or GPT) that defines for each page in the system physical address space granule protection information (GPI) indicating the PAS TAG it is associated with and (optionally) other Granule Protection attributes.

The hardware filter 20 checks the World ID and the Security Attributes against the Granule's GPI and decides if access can be granted or not, thus forming a Granular Memory Protection Unit (GMPU).

The GPT 56 can reside in on-chip SRAM or in off-chip DRAM, for example. If stored off-chip, the GPT 56 may be integrity-protected by an on-chip memory protection engine that may use encryption, integrity and freshness mechanisms to maintain security of the GPT 56.

Locating the GMPU 20 on the requester-side of the system (e.g. on the MMU output) rather than on the completer-side allows allocating access permissions in page granularity while permitting the interconnect 8 to continue hashing/striping the page across multiple DRAM ports.

Transactions remain tagged with the PAS TAG as they propagate throughout the system fabric 24, 8 until reaching a location defined as the Point of Physical Aliasing 60. This allows to locate the filter on the Master-side without diminishing the security guarantees comparing to Slave-side filtering. As the transaction propagates throughout the system, the PAS TAG can be used as an in-depth security mechanism for address isolation: e.g. caches can add the PAS TAG to the address tag in the cache, preventing accesses made to the same PA using the wrong PAS TAG from hitting in the cache and therefore improving side-channel resistance. The PAS TAG can also be used as context selector for a Protection Engine attached to the memory controller that encrypts data before it is written to external DRAM.

The Point of Physical Aliasing (PoPA) is a location in the system where the PAS TAG is stripped and the address changes back from a Logical Physical Address to a System Physical Address. The PoPA can be located below the caches, at the completer-side of the system where access to the physical DRAM is made (using encryption context resolved through the PAS TAG). Alternatively, it may be located above the caches to simplify system implementation at the cost of reduced security.

At any point in time, a world can request to transition a page from one PAS to another. The request is made to the monitor code 29 at EL3 which inspects the current state of the GPI. EL3 may only allow a specific set of transitions to occur (e.g. from Non-secure PAS to Secure PAS but not from Realm PAS to Secure PAS). To provide a clean transition, a new instruction is supported by the System—"Data Clean and Invalidate to the Point of Physical Aliasing" which EL3 can submit before transitioning a page to the new PAS—this guarantees that any residual state associated with the previous PAS is flushed from any caches upstream of (closer to the requester-side than) the PoPA 60.

Another property that can be achieved by attaching the GMPU 20 to the master side is efficient sharing of memory between worlds. It may be desirable to grant a subset of N worlds with shared access to a physical granule while preventing other worlds from accessing it. This can be achieved by adding a "restrictive shared" semantic to the Granule Protection Information, while forcing it to use a specific PAS TAG. As an example, the GPI can indicate that a physical Granule is can accessed only by "Realm World" 88 and "Secure World" 84 while being tagged with the PAS TAG of the Secure PAS 84.

An example of the above property is making fast changes in the visibility properties of a specific physical granule. Consider a case where each world is assigned with a private PAS that is only accessible to that World. For specific granules, the World can request to make them visible to the Non-Secure world at any point in time by changing their GPI from "exclusive" to "restrictive shared with Non-Secure world", and without changing the PAS association. This way, the visibility of that granule can be increased without requiring costly cache-maintenance or data copy operations.

FIG. 4 illustrates the concept of aliasing of the respective physical address spaces onto physical memory provided in hardware. As described earlier, each of the domains 82, 84, 86, 88 has its own respective physical address space 61.

At the point when a physical address is generated by address translation circuitry 16, the physical address has a value within a certain numeric range 62 supported by the system, which is the same regardless of which physical address space is selected. However, in addition to the generation of the physical address, the address translation circuitry 16 may also select a particular physical address space (PAS) based on the current domain 14 and/or information in the page table entry used to derive the physical address. Alternatively, instead of the address translation circuitry 16 performing the selection of the PAS, the address translation circuitry (e.g. MMU) could output the physical address and the information derived from the page table entry (PTE) which is used for selection of the PAS, and then this information could be used by the PAS filter or GMPU 20 to select the PAS.

The selection of PAS for a given memory access request may be restricted depending on the current domain in which the processing circuitry 10 is operating when issuing the memory access request, according to rules defined in the following table:

| Current Domain | Non-Secure PAS | Secure PAS | Realm PAS | Root PAS |
|---|---|---|---|---|
| Non-secure | Accessible | Inaccessible | Inaccessible | Inaccessible |
| Secure | Accessible | Accessible | Inaccessible | Inaccessible |
| Realm | Accessible | Inaccessible | Accessible | Inaccessible |
| Root | Accessible | Accessible | Accessible | Accessible |

For those domains for which there are multiple physical address spaces available for selection, the information from the accessed page table entry used to provide the physical address is used to select between the available PAS options.

Hence, at the point when the PAS filter 20 outputs a memory access request to the system fabric 24, 8 (assuming it passed any filtering checks), the memory access request is associated with a physical address (PA) and a selected physical address space (PAS).

From the point of view of memory system components (such as caches, interconnects, snoop filters etc.) which operate before the point of physical aliasing (PoPA) 60, the respective physical address spaces 61 are viewed as entirely separate ranges of addresses which correspond to different system locations within memory. This means that, from the point of view of the pre-PoPA memory system components, the range of addresses identified by the memory access request is actually four times the size of the range 62 which could be output in the address translation, as effectively the PAS identifier is treated as additional address bits alongside the physical address itself, so that depending on which PAS is selected the same physical address PAx can be mapped to a number of aliasing physical addresses 63 in the distinct physical address spaces 61. These aliasing physical addresses 63, all actually correspond to the same memory system location implemented in physical hardware, but the pre-PoPA memory system components treat aliasing addresses 63 as separate addresses. Hence, if there are any pre-PoPA caches or snoop filters allocating entries for such addresses, the aliasing addresses 63 would be mapped into different entries with separate cache hit/miss decisions and separate coherency management. This reduces likelihood or effectiveness of attackers using cache or coherency side channels as a mechanism to probe the operation of other domains.

The system may include more than one PoPA 60 (e.g. as shown in FIG. 14 discussed below). At each PoPA 60, the aliasing physical addresses are collapsed into a single de-aliased address 65 in the system physical address space 64. The de-aliased address 65 is provided downstream to any post-PoPA components, so that the system physical address space 64 which actually identifies memory system locations is once more of the same size as the range of physical addresses that could be output in the address translation performed on the requester side. For example, at the PoPA 60 the PAS identifier may be stripped out from the addresses, and for the downstream components the addresses may simply be identified using the physical address value, without specifying the PAS. Alternatively, for some cases where some completer-side filtering of memory access request is desired, the PAS identifier could still be provided downstream of the PoPA 60, but may not be interpreted as part of the address so that the same physical addresses appearing in different physical address spaces 60 would be interpreted downstream of the PoPA as referring to the same memory system location, but the supplied PAS identifier can still be used for performing any completer-side security checks.

FIG. 5 illustrates how the system physical address space 64 can be divided, using the granule protection table 56, into chunks allocated for access within a particular architectural physical address space 61. The granule protection table (GPT) 56 defines which portions of the system physical address space 65 are allowed to be accessed from each architectural physical address space 61. For example the GPT 56 may comprise a number of entries each corresponding to a granule of physical addresses of a certain size (e.g. a 4K page) and may define an assigned PAS for that granule, which may be selected from among the non-secure, secure, realm and root domains. By design, if a particular granule or set of granules is assigned to the PAS associated with one of the domains, then it can only be accessed within the PAS associated with that domain and cannot be accessed within the PASs of the other domains.

However, note that while a granule allocated to the secure PAS (for instance) cannot be accessed from within the root PAS, the root domain 82 is nevertheless able to access that granule of physical addresses by specifying in its page tables the PAS selection information for ensuring that virtual addresses associated with pages which map to that region of physical addressed memory are translated into a physical address in the secure PAS instead of the root PAS. Hence, the sharing of data across domains (to the extent permitted by the accessibility/inaccessibility rules defined in the table described earlier) may be controlled at the point of selecting the PAS for a given memory access request.

However, in some implementations, in addition to allowing a granule of physical addresses to be accessed within the assigned PAS defined by the GPT, the GPT could use other GPT attributes to mark certain regions of the address space as shared with another address space (e.g. an address space associated with a domain of lower or orthogonal privilege which would not normally be allowed to select the assigned PAS for that domain's access requests). This can facilitate temporary sharing of data without needing to change the assigned PAS for a given granule. For example, in FIG. 5 the region 70 of the realm PAS is defined in the GPT as being assigned to the realm domain, so normally it would be inaccessible from the non-secure domain 86 because the non-secure domain 86 cannot select the realm PAS for its access requests. As the non-secure domain 26 cannot access the realm PAS, then normally non-secure code could not see the data in region 70. However, if the realm temporarily wishes to share some of its data in its assigned regions of memory with the non-secure domain then it could request that the monitor code 29 operating in the root domain 82 updates the GPT 56 to indicate that region 70 is to be shared with the non-secure domain 86, and this may make region 70 also be accessible from the non-secure PAS as shown on the left hand side of FIG. 5, without needing to change which domain is the assigned domain for region 70. If the realm domain has designated a region of its address space as shared with the non-secure domain, then although the memory access requests targeting that region which are issued from the non-secure domain may initially specify the non-secure PAS, the PAS filter 20 may remap the PAS identifier of the request to specify the realm PAS instead, so that downstream memory system components treat the request as if it was issued from the realm domain all along. This sharing can improve performance because the operations for assigning a different domain to a particular memory region may be more performance intensive involving a greater degree of cache/TLB invalidation and/or data zeroing in memory or copying of data between memory regions, which may be unjustified if the sharing is only expected to be temporary.

FIG. 6 is a flow diagram showing how to determine the current domain of operation, which could be performed by the processing circuitry 10 or by address translation circuitry 16 or the PAS filter 20. At step 100 it is determined whether the current exception level 15 is EL3 and if so then at step 102 the current domain is determined to be the root domain 82. If the current exception level is not EL3, then at step 104 the current domain is determined to be one of the non-secure, secure and realm domains 86, 84, 88 as indicated by at least two domain indicating bits 14 within an EL3 control register of the processor (as the root domain is indicated by the current exception level being EL3, it may not be essential to have an encoding of the domain indicating bits 14 corresponding to the root domain, so at least one encoding of the domain indicating bits could be reserved for other purposes). The EL3 control register is writable when operating at EL3 and cannot be written from other exception levels EL2-EL0.

FIG. 7 shows an example of page table entry (PTE) formats which can be used for page table entries in the page table structures used by the address translation circuitry 16 for mapping virtual addresses to physical addresses, mapping virtual addresses to intermediate addresses or mapping intermediate addresses to physical addresses (depending on whether translation is being performed in an operating state where a stage 2 translation is required at all, and if stage 2 translation is required, whether the translation is a stage 1 translation or a stage 2 translation). In general, a given page table structure may be defined as a multi-level table structure which is implemented as a tree of page tables where a first level of the page table is identified based on a base address stored in a translation table base address register of the processor, and an index selecting a particular level 1 page table entry within the page table is derived from a subset of bits of the input address for which the translation lookup is being performed (the input address could be a virtual address for stage 1 translations of an intermediate address for stage 2 translations). The level 1 page table entry may be a "table descriptor" 110 which provides a pointer 112 to a next level page table, from which a further page table entry can then be selected based on a further subset of bits of the input address. Eventually, after one or more lookups to successive levels of page tables, a block or page descriptor PTE 114, 116, 118 may be identified which provides an output address 120 corresponding to the input address. The output address could be an intermediate address (for stage 1 translations performed in an operating state where further stage 2 translation is also performed) or a physical address (for stage 2 translations, or stage 1 translations when stage 2 is not needed).

To support the distinct physical address spaces described above, the page table entry formats may, in addition to the next level page table pointer 112 or output address 120, and any attributes 122 for controlling access to the corresponding block of memory, also specify some additional state for use in physical address space selection.

For a table descriptor 110, the PTEs used by any domain other than the non-secure domain 86 includes a non-secure table indicator 124 which indicates whether the next level page table is to be accessed from the non-secure physical address space or from the current domain's physical address space. This helps to facilitate more efficient management of page tables. Often the page table structures used by the root, realm or secure domains 24 may only need to define special page table entries for a portion of the virtual address space, and for other portions the same page table entries as used by the non-secure domain 26 could be used, so by providing the non-secure table indicator 124 this can allow higher levels of the page table structure to provide dedicated realm/secure table descriptors, while at a certain point of the page table tree, the root realm or secure domains could switch to using page table entries from the non-secure domain for those portions of the address space where higher security is not needed. Other page table descriptors in other parts of the tree of page tables could still be fetched from the relevant physical address space associated with the root, realm or the secure domain.

On the other hand, the block/page descriptors 114, 116, 118 may, depending on which domain they are associated with, include physical address space selection information 126. The non-secure block/page descriptors 118 used in the non-secure domain 86 do not include any PAS selection information because the non-secure domain is only able to access the non-secure PAS. However for the other domains the block/page descriptor 114, 116 includes PAS selection information 126 which is used to select which PAS to translate the input address into. For the root domain 22, EL3 page table entries may have PAS selection information 126 which includes at least 2 bits to indicate the PAS associated with any of the 4 domains 82, 84, 86, 88 as the selected PAS into which the corresponding physical address is to be translated. In contrast, for the realm and secure domains, the corresponding block/page descriptor 116 need only include one bit of PAS selection information 126 which, for the realm domain, selects between the realm and non-secure PASs, and for the secure domain selects between the secure and non-secure PASs. To improve efficiency of circuit implementation and avoid increasing the size of page table entries, for the realm and secure domains the block/page descriptor 116 may encode the PAS selection information 126 at the same positon within the PTE, regardless of whether the current domain is realm or secure, so that the PAS selection bit 126 can be shared.

Hence, FIG. 8 is a flow diagram showing a method of selecting the PAS based on the current domain and the information 124, 126 from the block/page PTE used in generating the physical address for a given memory access request. The PAS selection could be performed by the address translation circuitry 16, or if the address translation circuitry forwards the PAS selection information 126 to the PAS filter 20, performed by a combination of address translation circuitry 16 and the PAS filter 20.

At step 130 in FIG. 8, the processing circuitry 10 issues a memory access request specifying a given virtual address (VA) as a target VA. At step 132 the address translation circuitry 16 looks up any page table entries (or cached information derived from such page table entries) in its TLB 18. If any required page table information is not available, address translation circuitry 16 initiates a page table walk to memory to fetch the required PTEs (potentially requiring a series of memory accesses to step through respective levels of the page table structure and/or multiple stages of address translation for obtaining mappings from a VA to an intermediate address (IPA) and then from an IPA to a PA). Note that any memory access requests issued by the address translation circuitry 16 in the page table walk operations may themselves be subject to address translation and PAS filtering, so the request received at step 130 could be a memory access request issued to request a page table entry from memory. Once the relevant page table information has been identified, the virtual address is translated into a physical address (possibly in two stages via an IPA). At step 134 the address translation circuitry 16 or the PAS filter 20 determines which domain is the current domain, using the approach shown in FIG. 6.

If the current domain is the non-secure domain then at step 136 the output PAS selected for this memory access request is the non-secure PAS.

If the current domain is the secure domain, then at step 138 the output PAS is selected based on the PAS selection information 126 which was included in the block/page descriptor PTE which provided the physical address, where the output PAS will be selected as either secure PAS or non-secure PAS.

If the current domain is the realm domain, then at step 140 the output PAS is selected based on the PAS selection information 126 included in the block/page descriptor PTE from which the physical address was derived, and in this case the output PAS is selected as either the realm PAS or the non-secure PAS.

If at step 134 the current domain is determined to be the root domain, then at step 142 the output PAS is selected based on the PAS selection information 126 in the root block/page descriptor PTE 114 from which the physical address was derived. In this case the output PAS is selected as any of the physical address spaces associated with the root, realm, secure and non-secure domains.

FIG. 9 illustrates an example of an entry of the GPT 56 for a given granule of physical addresses. The GPT entry 150 includes an assigned PAS identifier 152 identifying the PAS assigned to that granule of physical addresses and optionally incudes further attributes 154, which could for example include the sharing attribute information 156 described earlier which enables the granule of physical addresses to become visible in one or more other PASs other than the assigned PAS. The setting of the sharing attribute information 156 could be performed by the root domain on request from code running in the domain associated with the assigned PAS. Also, the attributes could include a pass-through indicator field 158 which indicates whether or not the GPT checks (for determining whether the selected PAS for a memory access request is allowed to access that granule of physical addresses) should be performed on the requester-side by the PAS filter 20 or by completer-side filtering circuitry at the completer device side of the interconnect as will be discussed further below. If the pass-through indicator 158 has a first value, then the requester-side filtering checks may be required at the PAS filter 20 on the requester side, and if these fail then the memory access request may be blocked and a fault may be signalled. However, if the pass through indicator 158 has a second value, then the requester-side filtering checks based on the GPT 56 may not be needed for memory access requests specifying a physical address in the granule of physical addresses corresponding to that GPT entry 150, and in this case the memory access request may be passed through to a cache 24 or interconnect 8 regardless of checking whether the selected PAS is one of the allowed PASs allowed to access that granule of physical addresses, with any such PAS-filtering checks then being performed later at the completer-side instead.

FIG. 10 is a flow diagram showing the requester-side PAS filtering checks performed by the PAS filter 20 at the requester side of the interconnect 8. At step 170 the PAS filter 20 receives the memory access request associated with a physical address and an output PAS which may be selected as shown in FIG. 8 described earlier.

At step 172 the PAS filter 20 obtains the GPT entry corresponding to the specified PA, either from the granule protection information cache 22 if available, or by issuing a request to memory to fetch the required GPT entry from a table structure stored in memory. Once the GPT entry needed has been obtained, then at step 174 the PAS filter determines whether the output PAS selected for the memory access request is the same as the assigned PAS 152 defined in the GPT entry obtained at step 172. If so, then at step 176 the memory access request (specifying the PA and the output PAS) can be allowed to be passed to the cache 24 or the interconnect 8.

If the output PAS is not the assigned PAS, then at step 178 the PAS filter determines whether the output PAS is indicated in the sharing attribute information 156 from the obtained GPT entry as an allowed PAS allowed to access the granule of addresses corresponding to the specified PA. If so, then again at step 176 the memory access request is allowed to be passed to the cache 24 or the interconnect 8. The sharing attribute information could be encoded as a unique bit (or set of bits) within the GPT entry 150, or could be encoded as one or more encodings of a field of the GPT entry 150 for which other encodings of that same field may indicate other information. If step 178 determines that the sharing attribute indicates that the output PAS other than the assigned PAS is allowed to access the PA, then at step 176 the PAS specified in the memory access request passed to the cache 24 or the interconnect 8 is the assigned PAS, not the output PAS. The PAS filter 20 transforms the PAS specified by the memory access request to match the assigned PAS so that downstream memory system components treat it the same as requests issued specifying the assigned PAS.

If the output PAS is not indicated in the sharing attribute information 156 as being allowed to access the specified physical address (or alternatively, in an implementation which does not support the sharing attribute information 156, step 178 is skipped) then at step 180 it is determined whether the pass through indicator 158 in the obtained GPT entry for the target physical address identifies that the memory access request can be passed through to the cache 24 or the interconnect 8 regardless of the checks performed at the requester-side PAS filter 20, and if the pass-through indicator is specified then at step 176 and the memory access request is again allowed to proceed (specifying the output PAS as the PAS associated with the memory access request). Alternatively, if none of the checks at steps 174, 178 and 180 identify that the memory access request is allowed, then at step 182 the memory access request is blocked. Hence the memory access request is not passed to the cache 24 or to the interconnect 8, and a fault may be signalled which may trigger exception processing to deal with the fault.

While steps 174, 178, 180 are shown sequentially in FIG. 10, these steps could also be implemented in parallel or in a different order if desired. Also it would be appreciated that steps 178 and 180 are not essential and some implementations may not support use of the sharing attribute information 156 and/or the pass through indicator 158.

FIG. 11 summarises the operation of the address translation circuitry 16 and PAS filter. The PAS filtering 20 can be regarded as an additional stage 3 check performed after the stage 1 (and optionally stage 2) address translations performed by the address translation circuitry. Note also that the EL3 translations are based on page table entries which provide two bits of address based selection information (labelled NS,NSE in the example of FIG. 11), while a single bit of selection information "NS" is used to select the PAS in the other states. The security state indicated in FIG. 11 as input to the granule protection check refers to the Domain ID identifying the current domain of the processing element 4.

FIG. 12 is a flow diagram showing processing of a stage 3 lookup cache invalidate instruction which can be used by the monitor code 29 operating in the root domain 82 to trigger invalidation of any lookup cache entries which depend on GPT entries associated with a particular physical address. This can be useful when the root domain is changing the allocation of which physical address space a given system PA is assigned to, so that any lookup caches 22 will not retain out of date information.

Hence, at step 200 processing circuitry 10 within a given processing element (requester device) 4 may execute the stage 3 lookup cache invalidation instruction. The instruction specifies a physical address.

At step 202, in response to the stage 3 lookup cache invalidate instruction the processing circuitry 10 may check whether the current exception level is EL3 and if not may at step 204 reject the instruction and/or signal an exception (such as an undefined instruction exception). This restricts the execution of the stage 3 lookup cache invalidate instruction to the monitor code 29 associated with the root domain to prevent malicious parties triggering loss of performance by forcing invalidation of granule protection information from lookup caches 22 as triggered by other exception levels.

If the current exception level is EL3 then, at step 206, in response to the instruction executed at step 200 the processing element issues at least one lookup cache invalidation command which is sent to any lookup caches 18, 22 which may contain information depending on a granule protection table entry associated with the physical address identified by the instruction. These caches may include not only the granule protection information cache 22 as shown in FIG. 1, but also in some implementations a combined TLB/granule protection cache which combines information from the page table structures and the GPT into a single entry. For such combined TLB/GPT caches, the combined cache may require the ability to be looked up both by virtual address and by physical address.

At step 208, in response to the issued command, the GPT caches 22 or combined TLB/GPT caches invalidate any entries which depend on granule protection information from a GPT entry associated with a granule of physical addresses corresponding to the physical address specified by the lookup cache invalidation command.

As caches within the memory system may tag entries with an identification of an associated PAS for those caches located prior to the PoPA, then if the root domain code 29 changes which PAS is associated with a certain granule of physical addresses by updating the GPT 56, there could still be data cached in pre-PoPA caches which is tagged with the wrong PAS for that granule of physical addresses. To prevent subsequent accesses issued after the GPT update hitting on cache entries which should no longer be accessible to the domain which issues those requests, it can be useful to provide an instruction which ensures that any cached entries associated with a particular physical address are invalidated in any caches which are prior to the PoPA 60. This instruction may be a different instruction to other types of cache invalidation instruction which may act on caches within a different subset of the memory system, such as caches prior to the point of coherency or caches local to a particular processing element. Hence, the processing circuitry may support a cache-invalidate-to-PoPA instruction which is distinguished in terms of the scope over which the invalidations are observed by the caches in the system, with that scope corresponding to the portion of the memory system upstream of the PoPA. That is, for this instruction the PoPA is the limit to the extent to which the invalidation has to be observed by caches.

FIG. 13 is a flow diagram showing processing of the cache-invalidate-to-PoPA instruction. At step 220 of the cache-invalidate-to-PoPA instruction is executed by the processing circuitry 10 of a given requester device 4. The instruction specifies a virtual address, and at step 222 this virtual address is mapped to a physical address. However, in some cases the execution of the instruction for invalidated caches up to the PoPA could be restricted for execution only in EL3 similar to the instruction shown in FIG. 12. At step 224 the processing element which executed the instruction issues invalidation commands specifying the physical address, with those commands being sent to any pre-PoPA caches 24 within the system. This may include caches upstream of the PoPA not only within the requester device 4 but also within the interconnect 8 or within other requester devices 4 or other memory system components which are located at a point where the distinct physical address spaces 61 are treated as separate ranges of addressed memory locations.

The cache-invalidate-to-PoPA instruction could in some cases be a "clean and invalidate" form of the instruction, which not only requests that data associated with the specified PA is invalidated from the pre-PoPA caches, but also requests that prior to invalidation the data is cleaned by writing back any dirty data to a location beyond the PoPA 60. Hence, at step 226, if the instruction is a clean and invalidate form of the instruction then the pre-PoPA caches receiving the command trigger a write back of the dirty data from any entries associated with the specified physical address. This data may be written to a cache beyond the PoPA or to main memory. If the instruction was not a clean and invalidate form of the instruction, or if clean and invalidate forms of the instruction are not supported then step 226 can be omitted and the method can proceed straight to step 228, which would also be performed if step 226 is performed. At step 228 the pre-PoPA caches which receive the commands at step 224 invalidate their entries which were associated with a specified physical address. Cached entries associated with a specified physical address are invalidated regardless of which PAS tag is associated with those entries.

Hence, the cache-invalidate-to-PoPA instruction can be used to ensure that the caches do not continue to tag entries associated with a given physical address with the wrong PAS identifier following an update of the GPT.

FIG. 14 shows a more detailed example of a data processing system which may implement some of the techniques discussed above. The elements which are the same as in earlier examples are illustrated with the same reference numerals. In the example of FIG. 14 the processing elements 4 are shown in more detail, in that in addition to the processing circuitry 10, address translation circuitry 16, TLB 18 and PAS filter 20, the caches 24 are shown in more detail including a level 1 instruction cache, level 1 data cache, level 2 cache, and optionally a shared level 3 cache 24 shared between processing elements. An interrupt controller 300 may control handling of interrupts by the respective processing elements.

As shown in FIG. 14, the processing elements 4, which are capable of executing program instructions to trigger accesses to memory, are not the only type of requesting device which may be provided with a requester-side PAS filter 20. In other examples, a system MMU 310 (which is provided for providing address translation functionality for requesting devices 312, 314 which do not support their own address translation functionality, such as an on-chip device 312 such as a network interface controller or display controller, or off-chip device 314 which may communicate with the system via a bus) may be provided with a PAS filter 20 to perform requester-side checking of GPT entries the same as for the PAS filter 20 in the processing elements 4. Other requesting devices could include a debug access port 316 and a control processor 318 which may again have PAS filters 20 associated with them to check whether memory access issued by the requesting devices 316, 318 to a particular physical address space are allowed, given the PAS assignments defined in the GPT 56.

The interconnect 8 is shown in more detail in FIG. 14 as a coherent interconnect 8, which as well as the routing fabric 320 also includes a snoop filter 322 for managing coherency between caches 24 in the respective processing elements, and one or more system caches 324 which may perform caching of shared data shared between requesting devices. The snoop filter 322 and system caches 324 may be located upstream of the PoPA 60 and so may tag their entries using the PAS identifier selected by the MMU 16, 310 for particular masters. Requesting devices 316, 318 not associated with an MMU could be assumed by default to always issue requesting a particular domain, such as the non-secure domain (or the root domain if they can be trusted).

FIG. 14 shows, as another example of a pre-PoPA component which treats aliasing physical addresses in the respective PASs as if they were referring to different address locations, a memory protection engine (MPE) 330 provided between the interconnect 8 and a given memory controller 6 for controlling access to off-chip memory 340. The MPE 330 may be responsible for encrypting data written to off-chip memory 340 to maintain confidentiality, and decrypting the data when read back. Also the MPE could protect against tampering of data stored in off-chip memory by generating integrity metadata when writing data to memory, and using the metadata when the data is read back from off-chip memory to verify whether the data has changed. When encrypting data or generating hashes for memory integrity, different keys could be used depending on which physical address space is being accessed, even if accessing aliasing physical addresses which actually correspond to the same location in the off-chip memory 340. This improves security by further isolating the data associated with different domains of operation.

In this example, the PoPA 60 is between the memory protection engine 330 and the memory controller 6, so that by the time requests reach the memory controller 6 the physical addresses are no longer treated as mapping to different physical locations in memory 340 depending on the physical address space from which they were accessed.

FIG. 14 shows another example of a completer device 6, which may be a peripheral bus or non-coherent interconnect used to communicate with peripherals 350 or regions of on-chip memory 360 (e.g. implemented as static random access memory (SRAM)). Also, the peripheral bus or non-coherent interconnect 6 could be used to communicate with secure elements 370 such as cryptographic units for performing cryptographic processing, a random number generator 372 or certain fuses 374 which store statically hard wired information. Also various power/reset/debug controllers 380 may be accessible through the peripheral bus or the non-coherent interconnect 6.

For the on-chip SRAM 360, it may be useful to provide a slave-side (completer-side) PAS filter 399 which can perform completer-side filtering of memory accesses based on completer-side protection information which defines which physical address spaces are allowed to access a given block of physical addresses. This completer-side information may be more coarsely defined than the GPT used by the requester-side PAS filters 20. For example, the slave-side information could simply indicate that an entire SRAM unit 361 could be dedicated for use by the realm domain, another SRAM unit 362 could be dedicated for use by the root domain, and so on for the other domains. Hence, relatively coarsely defined blocks of physical addresses could be directed to the different SRAM units. This completer-side protection information could be statically defined by the boot-loader code loading in information to the completer-side PAS filter at boot time that cannot be changed at run time, so it is not as flexible as the GPTs used by the requester-side PAS filters 20. However, for use cases where the division of physical addresses into particular regions accessible to each domain is known at boot time and will not change, and do not require a fine-grained partitioning, it can be more efficient to use the slave-side PAS filter 399 instead of the PAS filter 20 on the requester side, as this may allow the power and performance cost of obtaining the GPT entry and comparing the assigned PAS and sharing attribute information with information for the current memory access request to be eliminated on the requester side. Also, if the pass-through indicator 158 can be indicated in a top-level GPT entry (or other table descriptor entry at a level other than the final level) in a multi-level GPT structure then accesses to further levels of the GPT structure (which may be performed to find more fine-grained information on the assigned PAS for requests to be subject to the requester-side checking) can be avoided for requests which target one of the regions of physical addresses which are mapped to the on-chip memory 360 which is policed by the completer-side PAS filter 399.

Hence, supporting a hybrid approach enabling both requester-side and completer-side checking of protection information can be useful for performance and power efficiency. The system designer may define which approach should be taken for particular regions of memory.

FIG. 15 illustrates a simulator implementation that may be used. Whilst the earlier described embodiments implement the present invention in terms of apparatus and methods for operating specific processing hardware supporting the techniques concerned, it is also possible to provide an instruction execution environment in accordance with the embodiments described herein which is implemented through the use of a computer program. Such computer programs are often referred to as simulators, insofar as they provide a software based implementation of a hardware architecture. Varieties of simulator computer programs include emulators, virtual machines, models, and binary translators, including dynamic binary translators. Typically, a simulator implementation may run on a host processor 430, optionally running a host operating system 420, supporting the simulator program 410. In some arrangements, there may be multiple layers of simulation between the hardware and the provided instruction execution environment, and/or multiple distinct instruction execution environments provided on the same host processor. Historically, powerful processors have been required to provide simulator implementations which execute at a reasonable speed, but such an approach may be justified in certain circumstances, such as when there is a desire to run code native to another processor for compatibility or re-use reasons. For example, the simulator implementation may provide an instruction execution environment with additional functionality which is not supported by the host processor hardware, or provide an instruction execution environment typically associated with a different hardware architecture. An overview of simulation is given in "Some Efficient Architecture Simulation Techniques", Robert Bedichek, Winter 1990 USENIX Conference, Pages 53-63.

To the extent that embodiments have previously been described with reference to particular hardware constructs or features, in a simulated embodiment, equivalent functionality may be provided by suitable software constructs or features. For example, particular circuitry may be implemented in a simulated embodiment as computer program logic. Similarly, memory hardware, such as a register or cache, may be implemented in a simulated embodiment as a software data structure. In arrangements where one or more of the hardware elements referenced in the previously described embodiments are present on the host hardware (for example, host processor 430), some simulated embodiments may make use of the host hardware, where suitable.

The simulator program 410 may be stored on a computer-readable storage medium (which may be a non-transitory medium), and provides a program interface (instruction execution environment) to the target code 400 (which may include applications, operating systems and a hypervisor) which is the same as the interface of the hardware architecture being modelled by the simulator program 410. Thus, the program instructions of the target code 400 may be executed from within the instruction execution environment using the simulator program 410, so that a host computer 430 which does not actually have the hardware features of the apparatus 2 discussed above can emulate these features. This can be useful, for example, for allowing testing of target code 400 being developed for a new version of a processor architecture before hardware devices actually supporting that architecture are yet available, as the target code can be tested by running within the simulator executing on a host device which does not support that architecture.

The simulator code includes processing program logic 412 which emulates the behaviour of the processing circuitry 10, e.g. including instruction decoding program logic which decodes instructions of the target code 400 and maps the instructions to corresponding sequences of instructions in the native instruction set supported by the host hardware 430 to execute functions equivalent to the decoded instructions. The processing program logic 412 also simulates processing of code in different exception levels and domains as described above. Register emulating program logic 413 maintains a data structure in a host address space of the host processor, which emulates architectural register state defined according to the target instruction set architecture associated with the target code 400. Hence, instead of such architectural state being stored in hardware registers 12 as in the example of FIG. 1, it is instead stored in the memory of the host processor 430, with the register emulating program logic 413 mapping register references of instructions of the target code 400 to corresponding addresses for obtaining the simulated architectural state data from the host memory. This architectural state may include the current domain indication 14 and current exception level indication 15 described earlier.

The simulation code includes address translation program logic 414 and filtering program logic 416 which emulate the functionality of the address translation circuitry 16 and PAS filter 20 respectively, with reference to the same page table structures and GPT 56 as described earlier. Hence, the address translation program logic 414 translates virtual addresses specified by the target code 400 into simulated physical addresses in one of the PASs (which from the point of view of the target code refer to physical locations in memory), but actually these simulated physical addresses are mapped onto the (virtual) address space of the host processor by address space mapping program logic 415. The filtering program logic 416 performs a lookup of granule protection information to determine whether to allow memory accesses triggered by the target code to proceed, in the same way as the PAS filter described above.

Further examples are set out in the following clauses:

(1) An apparatus comprising: processing circuitry to perform processing in one of at least three domains; and address translation circuitry to translate a virtual address of a memory access performed from a current domain to a physical address in one of a plurality of physical address spaces selected based at least on the current domain; in which: the at least three domains include a root domain for managing switching between a plurality of other domains of the at least three domains; and the plurality of physical address spaces include a root physical address space associated with the root domain, separate from physical address spaces associated with the plurality of other domains.

(2) The apparatus according to clause (1), in which the root physical address space is exclusively accessible from the root domain.

(3) The apparatus according to any of clauses (1) and (2), in which all of the plurality of physical address spaces are accessible from the root domain.

(4) The apparatus according to any preceding clause, in which the plurality of other domains comprise at least: a secure domain associated with a secure physical address space, and a less secure domain associated with a less secure physical address space; the less secure physical address space is accessible from the less secure domain, the secure domain and the root domain; and the secure physical address space is accessible from the secure domain and the root domain and is inaccessible from the less secure domain.

(5) The apparatus according to clause (4), in which the plurality of other domains also comprise a further domain associated with a further physical address space; the less secure physical address space is also accessible from the further domain; and the further physical address space is accessible from the further domain and the root domain and is inaccessible from the less secure domain.

(6) The apparatus according to clause (5), in which the further physical address space is inaccessible from the secure domain; and the secure physical address space is inaccessible from the further domain.

(7) The apparatus according to any of clauses (4) to (6), in which the less secure physical address space is accessible from all of said at least three domains.

(8) The apparatus according to any preceding clause, in which the address translation circuitry is configured to translate the virtual address to the physical address based on at least one page table entry; and at least when the current domain is one of a subset of said at least three domains, the address translation circuitry is configured to select said one of said plurality of physical address spaces based on the current domain and physical address space selection information specified in said at least one page table entry.

(9) The apparatus according to clause (8), in which when the current domain is the root domain, the address translation circuitry is configured to translate the virtual address to the physical address based on a root-domain page table entry for which the physical address space selection information comprises at least two bits of physical address space selection information for selecting between at least three physical address spaces accessible from the root domain.

(10) The apparatus according to clause (6), in which the address translation circuitry is configured to translate the virtual address to the physical address based on at least one page table entry; when the current domain is the secure domain, the address translation circuitry is configured to select whether said one of said plurality of physical address spaces is the secure physical address space or the less secure physical address space based on a physical address space selection indicator specified in the at least one page table entry; and when the current domain is the further domain, the address translation circuitry is configured to select whether said one of said plurality of physical address spaces is the further physical address space or the less secure physical address space based on a physical address space selection indicator specified in the at least one page table entry.

(11) The apparatus according to clause (10), in which the physical address space selection indicator is encoded at a same position within the at least one page table entry regardless of whether the current domain is the secure domain or the further domain.

(12) The apparatus according to any preceding clause, comprising at least one pre-PoPA memory system component provided upstream of a point of physical aliasing (PoPA), to treat aliasing physical addresses from different physical address spaces which correspond to the same memory system resource as if the aliasing physical addresses correspond to different memory system resources.

(13) The apparatus according to clause (12), in which the aliasing physical addresses comprise physical addresses represented using the same physical address value in the different physical address spaces.

(14) The apparatus according to any of clauses (12) and (13), comprising a PoPA memory system component configured to de-alias the plurality of aliasing physical addresses to obtain a de-aliased physical address to be provided to at least one downstream memory system component.

(15) The apparatus according to any of clauses (12) to (14), in which said at least one pre-PoPA memory system component comprises at least one pre-PoPA cache; and in response to a cache-invalidate-to-PoPA instruction specifying a target address, the processing circuitry is configured to issue at least one invalidation command to request that said at least one pre-PoPA cache invalidates one or more entries associated with a target physical address value corresponding to the target address.

(16) The apparatus according to clause (15), in which when the processing circuitry issues the at least one invalidation command, at least one post-PoPA cache located downstream of the PoPA is allowed to retain one or more entries associated with the target physical address value.

(17) The apparatus according to any of clauses (15) and (16), in which in response to the at least one invalidation command, the at least one pre-PoPA cache is configured to invalidate the one or more entries associated with the target physical address value regardless of which of the plurality of physical address spaces is associated with said one or more entries.

(18) The apparatus according to any preceding clause, comprising memory encryption circuitry responsive to a memory access request specifying a selected physical address space and a target physical address within the selected physical address space, when the target physical address is within a protected address region, to encrypt or decrypt data associated with the protected region based on one of a plurality of encryption keys selected depending on the selected physical address space.

(19) A data processing method comprising: performing processing in one of at least three domains; and translating a virtual address of a memory access performed from a current domain to a physical address in one of a plurality of physical address spaces selected based at least on the current domain; in which: the at least three domains include a root domain for managing switching between a plurality of other domains of the at least three domains; and the plurality of physical address spaces include a root physical address space associated with the root domain, separate from physical address spaces associated with the plurality of other domains.

(20) A computer program for controlling a host data processing apparatus to provide an instruction execution environment for execution of target code; the computer program comprising: processing program logic to simulate processing of the target code in one of at least three domains; and address translation program logic to translate a virtual address of a memory access performed from a current domain to a physical address in one of a plurality of simulated physical address spaces selected based at least on the current domain; in which: the at least three domains include a root domain for managing switching between a plurality of other domains of the at least three domains; and the plurality of simulated physical address spaces include a root simulated physical address space associated with the root domain, separate from simulated physical address spaces associated with the plurality of other domains.

(21) A computer-readable storage medium storing the computer program of clause (20).

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope of the invention as defined by the appended claims.

The invention claimed is:

1. An apparatus comprising:
   address translation circuitry to translate a target virtual address specified by a memory access request issued by requester circuitry into a target physical address; and
   requester-side filtering circuitry to perform a granule protection lookup based on the target physical address and a selected physical address space associated with the memory access request, to determine whether to allow the memory access request to be passed to a cache or passed to an interconnect for communicating with a completer device for servicing the memory access request, where said selected physical address space is one of a plurality of physical address spaces; in which:
   in the granule protection lookup, the requester-side filtering circuitry is configured to:
   obtain granule protection information corresponding to a target granule of physical addresses including the target physical address, the granule protection information indicative of at least one allowed physical address space associated with the target granule; and
   block the memory access request when the granule protection information indicates that the selected physical address space is not one of said at least one allowed physical address space;
   the apparatus comprising a point of physical aliasing (PoPA) memory system component configured to de-alias a plurality of aliasing physical addresses from different physical address spaces which correspond to the same memory system resource, to map any of the plurality of aliasing physical addresses to a de-aliased physical address to be provided to at least one downstream memory system component; and
   at least one pre-PoPA memory system component provided upstream of the PoPA memory system component, where the at least one pre-PoPA memory system component is configured to treat the aliasing physical addresses from different physical address spaces as if the aliasing physical addresses correspond to different memory system resources.

2. The apparatus according to claim 1, in which the granule protection information specifies an assigned physical address space assigned to the target granule of physical addresses; and
   the at least one allowed physical address space includes at least the assigned physical address space.

3. The apparatus according to claim 2, in which the granule protection information also comprises sharing attribute information indicative of whether at least one other physical address space other than the assigned physical address space is one of said at least one allowed physical address space.

4. The apparatus according to claim 3, in which when the granule protection lookup determines that the selected physical address space is a physical address space other than the assigned physical address space which is one of said at least one allowed physical address space indicated by the sharing attribute information, the requester-side filtering circuitry is configured to allow the memory access request to be passed to the cache or interconnect specifying the assigned physical address space instead of the selected physical address space.

5. The apparatus according to claim 1, in which the requester-side filtering circuitry is configured to perform the granule protection lookup in at least one lookup cache configured to cache the granule protection information.

6. An apparatus comprising:
   address translation circuitry to translate a target virtual address specified by a memory access request issued by requester circuitry into a target physical address; and
   requester-side filtering circuitry to perform a granule protection lookup based on the target physical address and a selected physical address space associated with the memory access request, to determine whether to allow the memory access request to be passed to a cache or passed to an interconnect for communicating with a completer device for servicing the memory access request, where said selected physical address space is one of a plurality of physical address spaces; in which:
   in the granule protection lookup, the requester-side filtering circuitry is configured to:

obtain granule protection information corresponding to a target granule of physical addresses including the target physical address, the granule protection information indicative of at least one allowed physical address space associated with the target granule; and block the memory access request when the granule protection information indicates that the selected physical address space is not one of said at least one allowed physical address space;

the requester-side filtering circuitry is configured to perform the granule protection lookup in at least one lookup cache configured to cache the granule protection information; and the at least one lookup cache is configured to store at least one combined translation-granule protection entry specifying information dependent on both the granule protection information and at least one page table entry used by the address translation circuitry for mapping the target virtual address to the target physical address.

7. An apparatus comprising:

address translation circuitry to translate a target virtual address specified by a memory access request issued by requester circuitry into a target physical address; and requester-side filtering circuitry to perform a granule protection lookup based on the target physical address and a selected physical address space associated with the memory access request, to determine whether to allow the memory access request to be passed to a cache or passed to an interconnect for communicating with a completer device for servicing the memory access request, where said selected physical address space is one of a plurality of physical address spaces; in which:

in the granule protection lookup, the requester-side filtering circuitry is configured to:

obtain granule protection information corresponding to a target granule of physical addresses including the target physical address, the granule protection information indicative of at least one allowed physical address space associated with the target granule; and block the memory access request when the granule protection information indicates that the selected physical address space is not one of said at least one allowed physical address space;

the requester-side filtering circuitry is configured to perform the granule protection lookup in at least one lookup cache configured to cache the granule protection information; and the at least one lookup cache is responsive to at least one lookup cache invalidation command specifying an invalidation target physical address to invalidate lookup cache entries storing information dependent on granule protection information associated with a granule of physical addresses including the invalidation target physical address.

8. The apparatus according to claim 1, in which the aliasing physical addresses are represented using the same physical address value in the different physical address spaces.

9. The apparatus according to claim 1, in which said at least one pre-PoPA memory system component comprises at least one pre-PoPA cache; and the apparatus comprises processing circuitry responsive to a cache-invalidate-to-PoPA instruction specifying a target address, to issue at least one invalidation command to request that said at least one pre-PoPA cache invalidates one or more entries associated with a target physical address value corresponding to the target address.

10. An apparatus comprising:

address translation circuitry to translate a target virtual address specified by a memory access request issued by requester circuitry into a target physical address; and requester-side filtering circuitry to perform a granule protection lookup based on the target physical address and a selected physical address space associated with the memory access request, to determine whether to allow the memory access request to be passed to a cache or passed to an interconnect for communicating with a completer device for servicing the memory access request, where said selected physical address space is one of a plurality of physical address spaces; in which:

in the granule protection lookup, the requester-side filtering circuitry is configured to:

obtain granule protection information corresponding to a target granule of physical addresses including the target physical address, the granule protection information indicative of at least one allowed physical address space associated with the target granule; and block the memory access request when the granule protection information indicates that the selected physical address space is not one of said at least one allowed physical address space; and at least one of the address translation circuitry and the requester-side filtering circuitry is configured to select the selected physical address space based at least on a current domain of operation of the requester circuitry from which the memory access request was issued, the current domain comprising one of a plurality of domains of operation.

11. The apparatus according to claim 10, in which the address translation circuitry is configured to translate the target virtual address to the target physical address based on at least one page table entry; and at least when the current domain is one of a subset of the plurality of domains, said at least one of the address translation circuitry and the requester-side filtering circuitry is configured to select the selected physical address space based on the current domain and physical address space selection information specified in said at least one page table entry.

12. The apparatus according to claim 10, in which the plurality of domains comprise at least a secure domain associated with a secure physical address space, and a less secure domain associated with a less secure physical address space;

the less secure physical address space is selectable as the selected physical address space when the current domain is the less secure domain or the secure domain; and the secure physical address space is selectable as the selected physical address space when the current domain is the secure domain, and is prohibited from being selected as the selected physical address space when the current domain is the less secure domain.

13. The apparatus according to claim 12, in which the plurality of domains also comprise a further domain associated with a further physical address space;

the less secure physical address space is selectable as the selected physical address space when the current domain is the further domain;

the further physical address space is selectable as the selected physical address space when the current domain is the further domain but is prohibited from being selected as the selected physical address space when the current domain is the secure domain or the less secure domain; and the secure address space is prohibited from being selected as the selected physical address space when the current domain is the further domain.

14. The apparatus according to claim 10, in which the plurality of domains include a root domain for managing switching between other domains, the root domain being associated with a root physical address space.

15. The apparatus according to claim 14, in which at least one of:

all of the physical address spaces are selectable as the selected physical address space when the current domain is the root domain; and the root physical address space is prohibited from being selected as the selected physical address space when the current domain is a domain other than the root domain.

16. The apparatus according to claim 14, in which the granule protection information is modifiable by software executed in the root domain.

17. The apparatus according to claim 1, in which the granule protection information is defined at page-level granularity.

18. The apparatus according to claim 1, in which the granule protection information is dynamically updatable at run-time.

19. An apparatus comprising:

address translation circuitry to translate a target virtual address specified by a memory access request issued by requester circuitry into a target physical address; and requester-side filtering circuitry to perform a granule protection lookup based on the target physical address and a selected physical address space associated with the memory access request, to determine whether to allow the memory access request to be passed to a cache or passed to an interconnect for communicating with a completer device for servicing the memory access request, where said selected physical address space is one of a plurality of physical address spaces; in which:

in the granule protection lookup, the requester-side filtering circuitry is configured to:

obtain granule protection information corresponding to a target granule of physical addresses including the target physical address, the granule protection information indicative of at least one allowed physical address space associated with the target granule; and block the memory access request when the granule protection information indicates that the selected physical address space is not one of said at least one allowed physical address space; and when the granule protection information specifies a pass-through indicator, the requester-side filtering circuitry is configured to determine whether to pass the memory access request to the cache or the interconnect independent of a check of whether the selected physical address space is one of said at least one allowed physical address space.

20. An apparatus comprising:

address translation circuitry to translate a target virtual address specified by a memory access request issued by requester circuitry into a target physical address; and requester-side filtering circuitry to perform a granule protection lookup based on the target physical address and a selected physical address space associated with the memory access request, to determine whether to allow the memory access request to be passed to a cache or passed to an interconnect for communicating with a completer device for servicing the memory access request, where said selected physical address space is one of a plurality of physical address spaces; in which:

in the granule protection lookup, the requester-side filtering circuitry is configured to:

obtain granule protection information corresponding to a target granule of physical addresses including the target physical address, the granule protection information indicative of at least one allowed physical address space associated with the target granule; and block the memory access request when the granule protection information indicates that the selected physical address space is not one of said at least one allowed physical address space;

the apparatus comprising completer-side filtering circuitry responsive to a memory access request received from the interconnect specifying a target physical address and a selected physical address space, to perform a completer-side protection lookup of completer-side protection information based on the target physical address and the selected physical address space, to determine whether the memory access request is allowed to be serviced by the completer device.

21. The apparatus according to claim 19, in which the pass-through indicator indicates that the at least one allowed physical address space is to be resolved by completer-side filtering circuitry.

* * * * *